(12) United States Patent
Rasmusson et al.

(10) Patent No.: US 8,107,753 B2
(45) Date of Patent: Jan. 31, 2012

(54) PREDICTION-BASED IMAGE PROCESSING

(75) Inventors: Jim Rasmusson, Vellinge (SE); Tomas Akenine-Möller, Lund (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/863,727

(22) PCT Filed: Jan. 19, 2009

(86) PCT No.: PCT/EP2009/050540
§ 371 (c)(1),
(2), (4) Date: Sep. 28, 2010

(87) PCT Pub. No.: WO2009/092681
PCT Pub. Date: Jul. 30, 2009

(65) Prior Publication Data
US 2011/0033127 A1 Feb. 10, 2011

Related U.S. Application Data

(60) Provisional application No. 61/022,397, filed on Jan. 21, 2008, provisional application No. 61/056,265, filed on May 27, 2008.

(30) Foreign Application Priority Data

May 6, 2008 (WO) .................. PCT/EP2008/055520
May 21, 2008 (WO) .................. PCT/EP2008/056288
Sep. 12, 2008 (EP) ..................................... 08164269

(51) Int. Cl.
*G06K 9/36* (2006.01)

(52) U.S. Cl. ......... 382/238; 382/232; 382/233; 382/239
(58) Field of Classification Search .................. 382/232, 382/233, 238, 239
See application file for complete search history.

(56) References Cited

U.S. PATENT DOCUMENTS

| 5,682,152 | A | 10/1997 | Wang et al. |
| 6,014,173 | A * | 1/2000 | Miyamoto ............... 375/240.16 |
| 6,246,799 | B1 * | 6/2001 | Ebisawa ........................ 382/243 |
| 6,654,503 | B1 | 11/2003 | Sudharsanan et al. |
| 6,909,811 | B1 * | 6/2005 | Kajiwara et al. .............. 382/246 |
| 7,835,582 | B2 * | 11/2010 | Nakayama ..................... 382/239 |
| 2002/0039386 | A1 * | 4/2002 | Han et al. ................. 375/240.16 |

OTHER PUBLICATIONS

Keissarian, F. "New Quadtree Predictive Image Coding Technique using Pattern-Based Classification." Visual Communications and Image Processing 2003, Lugano, Jul. 8, 2003.

(Continued)

*Primary Examiner* — Stephen Koziol
(74) *Attorney, Agent, or Firm* — Coats & Bennett, P.L.L.C.

(57) ABSTRACT

A pixel block (300) is compressed by sub-sampling at least a portion of the pixels (310) into subblocks (320, 330). Predictions are determined for the property values of these subblocks (320, 330) by calculating a variance measure based on property values of neighboring pixels (310)/subblocks (320, 330) in two prediction directions in the block (300) relative to a current subblock (320, 330). If the variance is below a threshold, the prediction is calculated based on neighboring property values in both directions. If the measure exceeds the threshold, the neighboring property values in only one of the two predictions directions are used for calculating the prediction. A guiding bit (450) descriptive of the selected direction is also provided. A prediction error is calculated based on the property value and the calculated prediction. The compressed block (400) comprises an encoded representation (460) of the prediction error and any guiding bit (470).

18 Claims, 11 Drawing Sheets

OTHER PUBLICATIONS

Kau, L-J. et al. "Least-Squares-Based Switching Structure for Lossless Image Coding." IEEE Transactions on Circuits and Systems I: Regular Papers, vol. 54, No. 7, Jul. 1, 2007, pp. 1529-1541.

Holt, K. M. et al. "Strategies for Quadtree Predictive Image Coding." Proceedings of the 2003 International Conference on Image Processing, Barcelona, Spain, Sep. 14-17, 2003, pp. 247-250.

Rasmusson, J. et al. "Exact and Error-bounded Approximate Color Buffer Compression and Decompression." Graphics Hardware, Aug. 4, 2007.

Khalid, S. Introduction to Data Compression, 2nd Ed. Morgan Kaufmann Publishers, 2000. pp. 156-157.

Clarke, R. J. Digital Compression of Still Images and Video (Section 7.1). Academic Press, 1995, pp. 197-201.

* cited by examiner

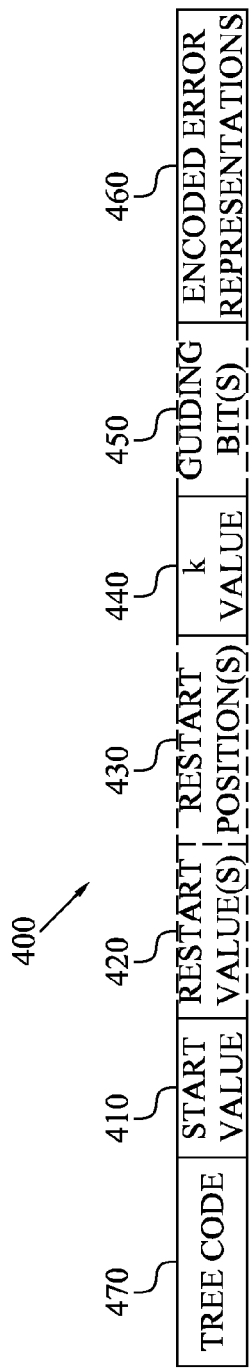
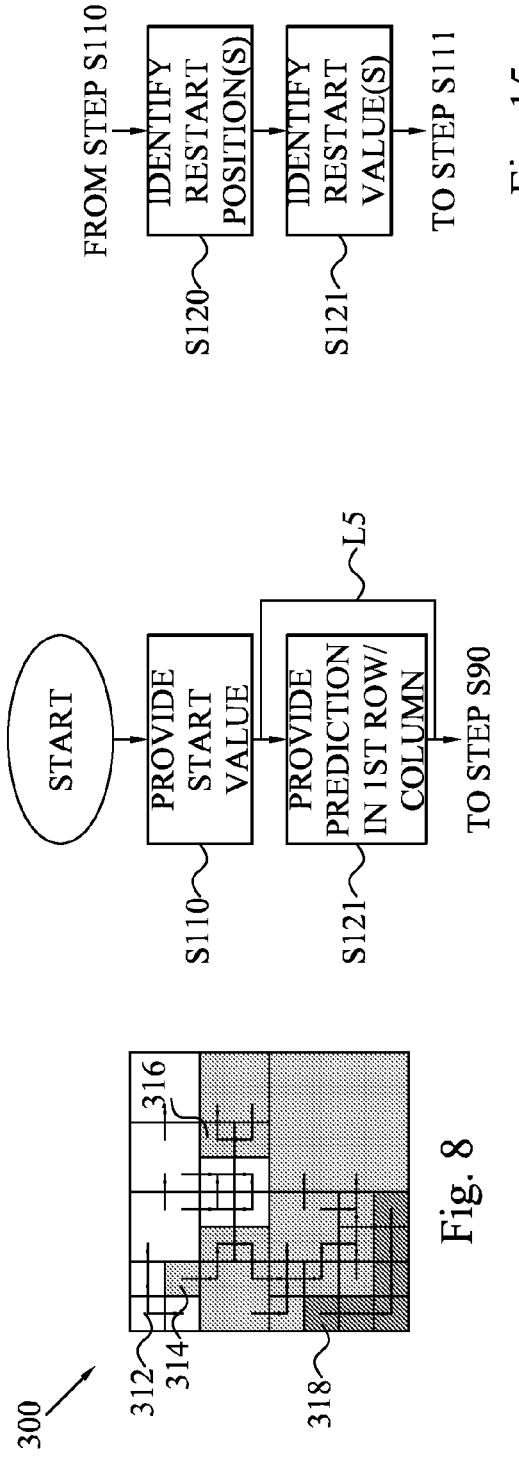

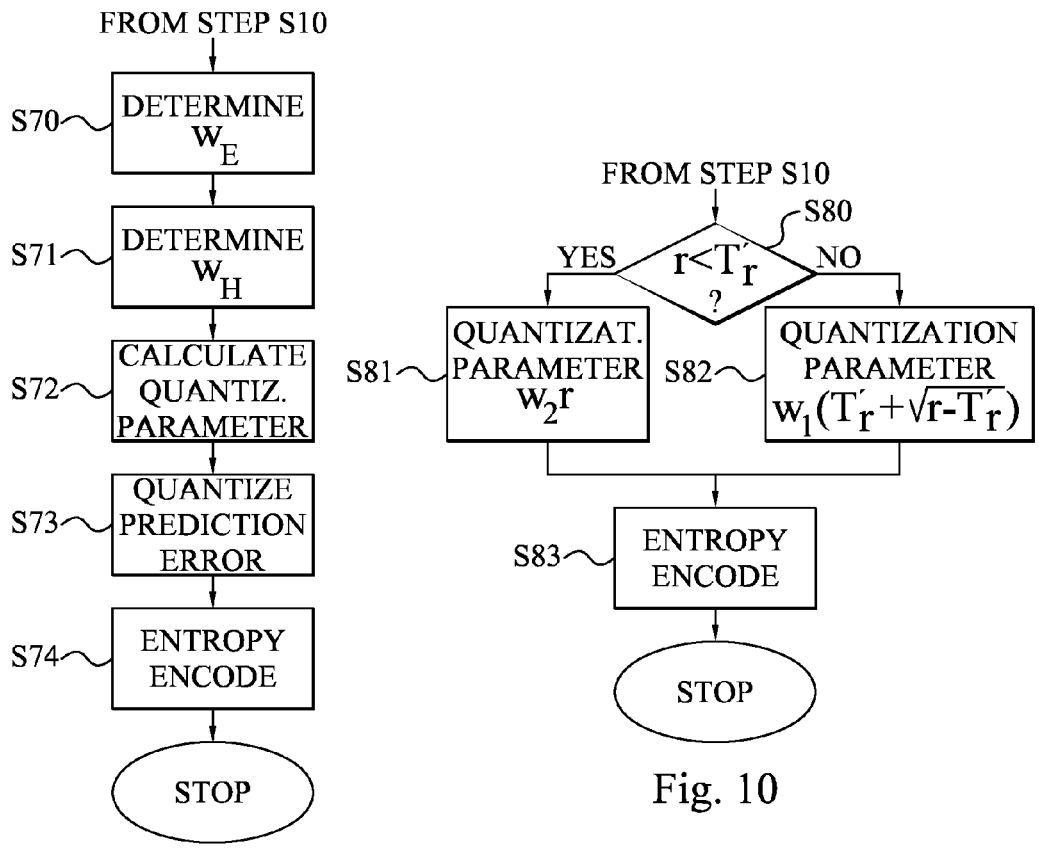
Fig. 9
Fig. 10
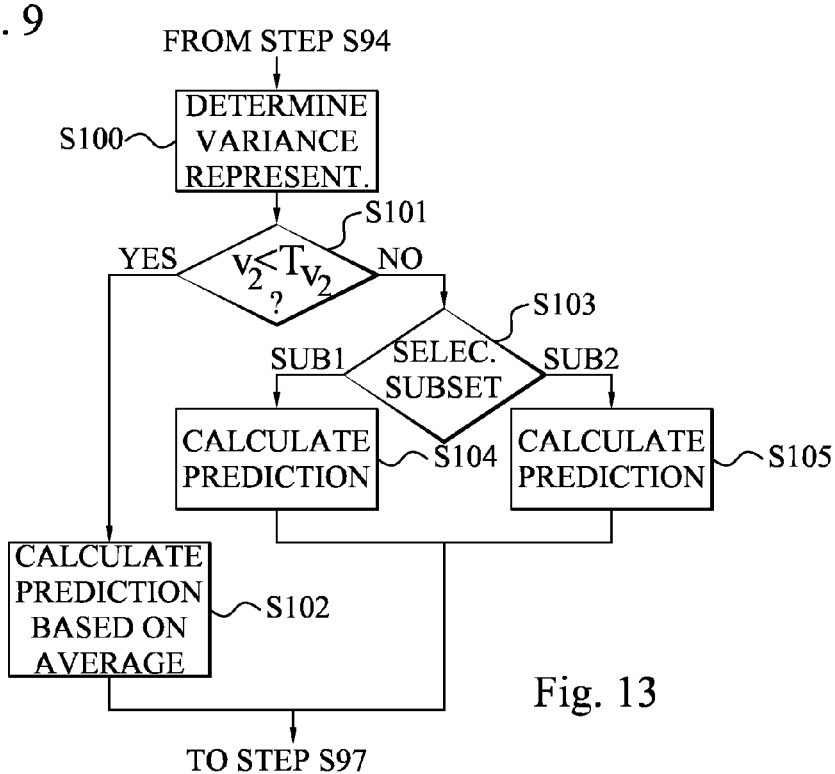
Fig. 13

PREDICTION-BASED IMAGE PROCESSING

TECHNICAL FIELD

The present invention generally relates to image processing, and in particular to prediction-based compression and decompression of pixel blocks.

BACKGROUND

In order to increase performance for graphics processing units (GPUs), memory bandwidth reduction techniques are employed. One such way to decrease the bandwidth requirements is to perform what is called buffer compression. A graphics system typically uses at least two buffers: a color buffer where the colors of the pixels are drawn and a depth buffer where the depth of each pixel is stored. During rendering these buffers are read and written to, and often the same pixel is accessed several times for both buffers. These read and write accesses are expensive in terms of energy and should therefore be kept to a minimum, in particular for user terminals with limited power supply, such as mobile devices.

Buffer compression implies that blocks of buffer data is stored in memory in compressed form. Documents [1] and [2] give good overviews of prior art color buffer compression and depth buffer compression, respectively.

Buffer data leads to an important problem as it may involve sharp edges between the drawn triangle and the background. Traditional buffer data techniques may run into problems when having a prediction-based buffer compression by predicting over the edge of such discontinuities.

SUMMARY

The present invention overcomes these and other drawbacks of the prior art arrangements.

It is a general object of the present invention to provide an efficient pixel block compression and decompression.

This and other objects are met by the invention as defined by the accompanying patent claims.

Briefly, the present invention involves compression and decompression of blocks of pixels having associated property values. The compression involves sub-sampling at least a portion of the pixels in the block by defining a hierarchical tree structure. This sub-sampling is conducted by hierarchically replacing a set of multiple pixels or multiple hierarchically lower subblocks with a (hierarchically higher) subblock. A property value for the subblock is determined based on at least a portion of the property values of the sub-sampled set of pixels/subblocks.

A prediction of the property value of the subblock is determined by calculating a variance measure for the subblock. This variance measure is descriptive of the variance in property values of neighboring pixels/subblocks in a first prediction direction and of neighboring pixels/subblocks in a second prediction direction. The variance measure is compared to a variance threshold and the pixels/subblocks to use as basis in the prediction calculation are determined from this comparison.

Thus, if the variance measure is smaller than the threshold, the prediction is calculated based on a weighted combination of at least one neighboring property value in the first direction and at least one neighboring value in the second direction. However, if the variance measure is not smaller than the threshold, the prediction is instead calculated based on at least one neighboring property value in only one of the first and second direction. Furthermore, a so-called guiding bit associated with the selected prediction direction is provided and included in the compressed block.

A prediction error is calculated for the subblock based on its property value and the calculated prediction. The generated compressed block comprises an encoded representation of this calculated prediction error plus the guiding bit if determined for the current subblock, and preferably a tree code representative of the hierarchical tree structure.

Decompression of the compressed block involves determination of a prediction error for a subblock to decode. This prediction error is determined based on the encoded error representation associated with the subblock and included in the compressed block. A prediction of the property value of the subblock is then provided. In similarity to the compression, a variance measure is calculated based on the already decoded, neighboring pixels/subblocks in the two prediction directions. If the variance measure is smaller than the threshold, the prediction is calculated based on the weighted combination of property values of neighboring pixels/subblock in both directions. However, in case the variance measure exceeds the threshold, a guiding bit assigned to the subblock and included in the compressed block is employed in the prediction provision. The guiding bit dictates from which of the two prediction directions to identify the at least one neighboring pixel/subblock to use as basis for calculating the property value prediction.

The property value of the subblock is obtained from the determined error prediction and the provided prediction.

The invention also relates to a compressor and decompressor.

The present technology avoids doing prediction across unnaturally sharp discontinuity edges. As a consequence, pixel blocks having such discontinuities in property values between different pixel positions can be effectively handled.

Other advantages offered will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 8 is a schematic overview of a pixel block illustrating the usage of start and restart pixels and subblocks;

FIG. 9 is a flow diagram illustrating an embodiment of the encoded representation determining step of FIG. 1;

FIG. 10 is a flow diagram illustrating another embodiment of the encoded representation determining step of FIG. 1;

FIG. 11 is a schematic overview of an embodiment of a compressed block representation;

FIG. 13 is a flow diagram illustrating an embodiment of the prediction calculating steps of FIG. 12;

FIG. 14 is a flow diagram illustrating additional steps of the block decompressing method;

FIG. 15 is a flow diagram illustrating additional steps of the block decompressing method;

DETAILED DESCRIPTION

Figure 1:
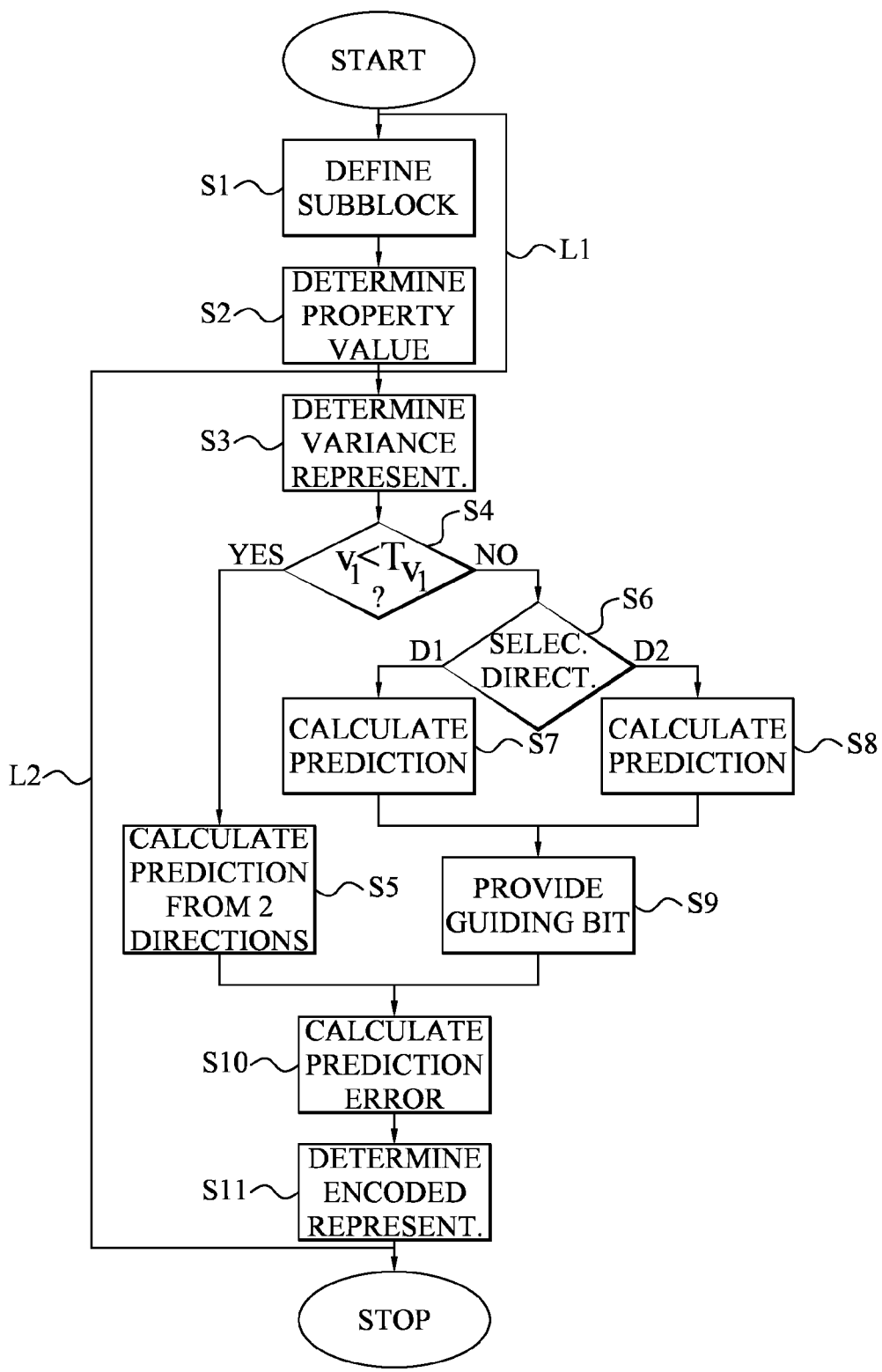
FIG. 1 is a flow diagram of a block compressing method according to an embodiment.

Throughout the drawings, the same reference characters will be used for corresponding or similar elements.

The present invention generally relates to compression and decompression of pixel property values, and in particular such a compression and decompression suitable for buffer compression and decompression.

Buffer compression/decompression can be used in three-dimensional (3D) graphics, such as games, 3D maps and scenes, 3D messages, e.g. animated messages, screen savers, man-machine interfaces (MMIs), etc., but is not limited thereto. Thus, the invention could also be employed for encoding other types of images or graphics, e.g. one-dimensional (1D), two-dimensional (2D) or 3D images.

The compression and decompression collectively handles a plurality of pixels, typically in the form of a block or a tile of pixels. In an embodiment, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and preferred such block embodiments could be 4×4 pixels, 8×8 pixels or 16×16 pixels.

The expression pixel or "block element" refers to an element in a block or encoded representation of a block. This block, in turn, corresponds to a portion of an image, texture or buffer. Thus, a pixel could be a texel (texture element) of a (1D, 2D, 3D) texture, a pixel of a (1D or 2D) image or a voxel (volume element) of a 3D image. Generally, a pixel is characterized with an associated pixel parameter or property value or feature. There are different such characteristic property values that can be assigned to pixels, typically dependent on what kind of pixel block to compress/decompress. For instance, the property value could be a color value assigned to the pixel. As is well known in the art, different color spaces are available and can be used for representing pixel color values. A usual such color space is the so-called red, green, blue (RGB) color space. A pixel property value could therefore be a red value, a green value or a blue value of an RGB color.

A pixel color can also be expressed in the form of luminance and chrominance components. In such a case, a transform can be used for converting a RGB color value into a luminance value and, typically, two chrominance components. Examples of luminance-chrominance spaces in the art include YUV, $YC_oC_g$ and $YC_rC_b$. A property value of the invention can therefore also be such a luminance value (Y) or a chrominance value (U, V, $C_o$, $C_g$, $C_r$ or $C_b$). In the case of compressing/decompressing pixel blocks of a color buffer, RGB colors of pixels are preferably converted into the luminance/chrominance color space. This not only decorrelates the RGB data leading to improved compression rates but also allows the possibility of having different compression strategies for the luminance and chrominance components. Thus, as the human visual system is more susceptible to errors in the luminance component, the chrominance components can typically be compressed more aggressively than the luminance component.

A particular color space transform to use is the $YC_oC_g$ transform disclosed in document [3]. This transform has low implementation complexity, i.e. is highly silicon-efficient, and provides good decorrelation. A further important feature is that is reversible: transforming the $YC_oC_g$ values back to RGB recreates the RGB values bit-exactly. The transform is defined as:

$C_o = R - B$ $t = B + (C_o \gg 1)$ $C_g = G - t$ $Y = t + (C_g \gg 1)$

The reverse transforming is:

$t = Y - (C_g \gg 1)$ $G = C_o + t$ $B = t - (C_o \gg 1)$ $R = B + C_o$ where $\gg$ denotes bitwise right shift.

The present invention is though not limited to compressing/decompressing blocks where the pixels have assigned color values as property values. In clear contrast, the invention can also be used in connection with, for instance, depth buffer compression/decompression. Then each pixel of a pixel block has a so-called depth value or Z value as property value.

Thus, the embodiments herein can indeed be used in compressing/decompressing pixel blocks where the included pixels have any pixel property feature available in the art. In the following, the embodiments are, though, mainly discussed further in connection with color buffer compression, where each pixel has, following color space transformation, a luminance value and at least one chrominance value. This should however merely be seen as an illustrative, but non-limiting, example of the scope of the present invention.

The present invention can be used for processing property values in any bit-resolution, including so-called low dynamic range (LDR) and high dynamic range (HDR) property values. The former is typically represented by a limited solution of an 8-bit integer in the art. In clear contrast HDR generally involves representing property values using a floating-point number, such as fp16 (also known as halfs), fp 32 (floats) or fp64 (doubles).

The floating-point nature of halfs, however, leads to problems. Since the density of floating-point numbers is not uniform, the difference between two floats may not be representable as a float with the same precision. This problem of floating-point numbers is solved by mapping each floating-point number to a respective integer representation. This basically corresponds to assigning, to each floating-point number, a unique integer number. Thus, the mapping from floating-point to integer domain involves assigning ever higher integer numbers to the ever higher floating-point number. This means that 0.0 will be assigned integer representation 0, the next smallest positive floating-point number is assigned 1, the second next smallest floating-point number is assigned 2 and so on.

Doing the calculations and arithmetic in the integer domain also avoids costly floating-point operations. Furthermore, since the compression may be lossless, a correct handling of NaN (Not a Number), Inf (Infinity) and denorms (denormal numbers) is also obtained. In such a case, during compression the floating-point numbers are interpreted as integers according to the above-presented mapping. Following decompression, the integer numbers are then re-interpreted back into floating-point numbers through the one-to-one mapping between integer and floating-point numbers described above.

The embodiments disclose prediction-based pixel block compression (coding) and decompression (decoding). The prediction-based data processing is furthermore well-adapted for handling discontinuities in the pixel property values caused by, for instance, sharp edges between a drawn triangle and the background. Such a dedicated discontinuity management is not well exploited in the prior art (buffer) compression schemes.

Compression

FIG. 1 is a flow diagram illustrating a method of compressing a block of multiple pixels according to an embodiment. Each pixel of the block has at least one respective pixel property value, such as a luminance value and two chrominance values.

The compression of the pixel block starts in step S1 that involves hierarchically defining a subblock of pixels in the block. This basically involves performing a quadtree decomposition of the block data to create a hierarchical tree structure of the pixels in the block, where "flat" or homogenous regions are sub-sampled into subblocks and, thus, represented in higher levels in the tree and using fewer property values than one per pixel.

Step S1, thus, involves defining a pixel subblock based on property values of a subset of the multiple pixels in the block (in the case of a first level subblock) or based on the property values of a set of hierarchically lower subblocks in the block (in the case of a second or higher level subblock). The relevant pixels or hierarchically lower subblocks are those pixels/subblocks in the block occupying the same area as the subblock to define in step S1. In a typical embodiment the subblock covers the area of n×m, preferably n×n and more preferably 2×2 pixels or hierarchically lower subblocks. The definition of the subblock and the quadtree structure can be performed in a bottom-up fashion or a top-down fashion.

A next step S2 determines a property value to use for the subblock defined in step S1. This property value is further determined based on at least a portion of the property values, preferably all property values, of the subset of n×m pixels or hierarchically lower subblocks.

This procedure of defining subblocks and determining property values for the subblocks are typically performed more than once for the block as indicated by the line L1. Thus, sets of n×m neighboring pixels in the block can be analyzed for determining whether their respective property values are deemed homogenous enough to replace the n×m pixels with a (first level) subblock. Each such set of n×m pixels is investigated in a given order in the block. Thereafter a second level investigation is taking place by investigating sets of n×m neighboring first level subblocks. If their determined property values are deemed homogenous enough they are replaced with a second level subblock. This procedure is repeated up to the top level, i.e. one single subblock and property value for the whole pixel block, or until the tested neighboring pixels or subblocks are no longer deemed sufficient homogenous. Other techniques of sub-sampling pixels through the usage of a tree structure are known in the art and can be used instead of this bottom-up approach.

Thereafter a prediction providing procedure starts in step S3 for providing a prediction of the determined property value of a defined subblock. This step S3 involves determining a variance representation of property value(s) of at least one neighboring pixel or subblock in a first prediction direction in the block and property value(s) of at least one neighboring pixel or subblock in a second prediction direction in the block.

The neighboring pixels or subblocks are adjacent the current subblock to compress in the block. In a preferred embodiment, the neighboring pixels/subblock are either present in a same subblock row or subblock column in the block as the current subblock. Thus, assume that the current subblock occupies the pixel positions (i,j) to (i+n,j+m) in the block. In such a case, the neighboring pixels and subblocks preferably occupy the positions (i−1, j) to (i−1, j+m) and (i,j−1) to (i+n,j−1), respectively.

The variance measure determined in step S3 is representative of a difference in property values in the two prediction directions. In other words, the variance representation is indicative of how close the property values or an average property value of the prediction-basing neighboring pixels and subblocks in the first direction is to the property values or an average property value of the neighboring pixels and subblocks in the second direction.

The determined variance representation $v_1$ is then compared to a variance threshold $T_{v_1}$ in step S4. If the variance representation is smaller than the threshold, the method continues from step S4 to step S5, otherwise it continues to step S6. It is anticipated that other embodiments can use other types of thresholds, such as $$\frac{1}{T_{v_1}}.$$

In such a case, the method continues to step S5 if the variance representation, expressed as $$\frac{1}{v_1},$$

is larger than the threshold $$\frac{1}{T_{v_1}}.$$

The relevant feature in the comparison of step S4 is therefore whether there is a small difference in the property values in the two directions, in which case the method continues to step S6, or if the property values in the two directions differ from each other so that the further processing is according to step S6.

The value of the threshold $T_{v_1}$ can be determined in an optimization procedure having as optimization goal to compress as many blocks of different color buffers, depth buffers, textures or images as possible and furthermore resulting in as short block compression lengths (in terms of number of bits) as possible. The actual value of the threshold depends on a number of factors, including the particular property value type used, the available range for the property values, etc.

Step S5 involves calculating the property value prediction of the current subblock from property values of neighboring pixels and/or subblocks present in both prediction directions. In other words, if the variance representation is small enough as determined in step S4, implying that the neighboring property values in the two prediction directions are fairly equal, the prediction of the property value of the current subblock should be calculated based on neighboring property values in both directions.

In a preferred embodiment, the prediction is determined in step S5 as a weighted combination of at least one neighboring property value in the first direction and at least one neighboring property value in the second direction.

Figure 2:
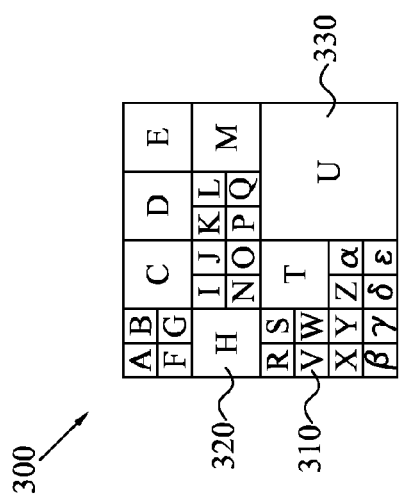
FIG. 2 is a schematic overview of pixel block to which the teaching of the present embodiments can be applied.

With reference to FIG. 2 illustrating an example of a pixel block 300 to be compressed. The figure illustrates the block 300 following the quadtree decomposition procedure. As is seen in the figure, some pixels have been merged into 2×2 first level subblocks 320, denoted C, D, E, H, M and T in the figure. Furthermore, the property values of the pixels in the lower right corner of the block where homogenous enough to form a second level subblock 330, denoted U in the figure. The remaining pixels 310 are not defined as subblocks as their property values are not homogenous enough when comparing with the neighboring pixels 310 to allow replacing the individual pixels with a subblock.

Assume that a current subblock U 330 is to be compressed. A first prediction direction includes a subblock T and two pixels $\alpha$, $\epsilon$, while the second direction includes two pixels P, Q and a subblock M. An embodiment of step S3 preferably involves determining an average value of the property values of these neighboring pixels and subblocks:

$$m = \left\lfloor \frac{T + \alpha + \varepsilon + P + Q + M}{6} \right\rfloor$$

or preferably, $$m = \left\lfloor \frac{2T + \alpha + \varepsilon + P + Q + 2M}{8} \right\rfloor$$

since the subblocks T, M has twice the size of the other neighboring pixels. $\lfloor \ \rfloor$ denotes the floor function, rounding to the nearest lower integer. Alternatively, rounding to nearest integer (the "round" function), the ceiling function or a simple average could instead be used. Next the variance representation is calculated based on this average value, such as by summing the squared difference between neighboring property values and the average value:

$$v_1 = (T-m)^2 + (\alpha-m)^2 + (\epsilon-m)^2 + (P-m)^2 + (Q-m)^2 + (M-m)^2$$

or preferably, $$v_1 = 2(T-m)^2 + (\alpha-m)^2 + (\epsilon-m)^2 + (P-m)^2 + (Q-m)^2 + 2(M-m)^2$$

Alternatively, the sum of the absolute differences could be calculated to get the variance parameter:

$$v_1 = 2|T-m| + |\alpha-m| + |\epsilon-m| + |P-m| + |Q-m| + 2|M-m|$$

If the determined variance parameter is below the threshold in step S4, the prediction of the current property value $\hat{U}$ is determined as a weighted combination of at least one of the property values of subblock T, pixels $\alpha$ and $\epsilon$ and at least one of the property values of pixels P and Q and subblock M. In a preferred embodiment, the prediction is determined as:

$$\hat{U} = h(w_1 f_1(T,\alpha,\epsilon) + w_2 f_2(P,Q,M))$$

where $w_{1,2}$ denotes different weights, $f_{1,2}(\ )$ denotes a function operating on the property values of the neighboring pixels and subblock in respective prediction direction and $h(\ )$ denotes a preferred floor, ceiling or round function. A typical example of weights and functions are the one given the prediction:

$$\hat{U} = \left\lfloor \frac{2T + \alpha + \varepsilon + P + Q + 2M}{8} \right\rfloor$$

Thus, the prediction determined in step S5 is preferably equal to the average of the neighboring pixel and subblock values.

However, if the determined variance representation exceeds the threshold in step S4, the method continues to step S6, where one of the first and second prediction directions is selected. This selection of step S6 is preferably performed based on respective comparisons of the property value of the current subblock with property values of the neighboring pixels/subblocks in either direction. In a typical embodiment, the average value of the property values in respective direction is calculated and compared to the current property value. Thus, if $$\left| U - \left\lfloor \frac{2T + \alpha + \varepsilon}{4} \right\rfloor \right| < \left| U - \left\lfloor \frac{P + Q + 2M}{4} \right\rfloor \right|$$

the first prediction direction (along the row) should be selected in step S6, otherwise the second prediction direction (along the column) should be selected.

The method therefore continues to step S7 or step S8, where the prediction of the current subblock is determined based on the property value of at least one neighboring pixel or subblock in the selected prediction direction: $\hat{U} = g_1(T,\alpha,\epsilon)$ respective $\hat{U} = g_2(P,Q,M)$ for some function $g_{1,2}(\ )$ operating on the neighboring property values in the selected direction.

In a first embodiment, the prediction is determined as an average of the neighboring property values, thus, $$\hat{U} = \left\lfloor \frac{2T + \alpha + \varepsilon}{4} \right\rfloor$$

if the method continues to step S7 or $$\hat{U} = \left\lfloor \frac{P + Q + 2M}{4} \right\rfloor$$

according to step S8.

In another embodiment, the prediction is determined based on the average of the neighboring property values in the selected direction but also involves the neighboring property value in a third direction, i.e. the pixel O in FIG. 2: $\hat{U}=h(w_3g_1(T,\alpha,\varepsilon)+w_4O)$ or $\hat{U}=h(w_3g_2(P,Q,M)+w_4O)$. In a preferred implementation of this embodiment, $$\hat{U} = \left\lfloor \frac{3}{4} \times \left(\frac{2T+\alpha+\varepsilon}{4}\right) + \frac{1}{4}O \right\rfloor$$

in step S7 and $$\hat{U} = \left\lfloor \frac{3}{4} \times \left(\frac{P+Q+2M}{4}\right) + \frac{1}{4}O \right\rfloor$$

in step S8.

The first and second embodiment above may also be combined. In such a case, once a prediction direction has been selected in step S6 a further test is made to see whether the prediction should be calculated solely based on the neighboring property values in one of the first and second directions or based on the neighboring property values in third direction and one of the first and second directions. Thus, if the first prediction direction is selected in step S6, it is investigated whether $$\left| \left\lfloor \frac{2T+\alpha+\varepsilon}{4} \right\rfloor - O \right| < s.$$

In such a case, step S7 preferably calculates the prediction as $$\hat{U} = \left\lfloor \frac{3}{4} \times \left(\frac{2T+\alpha+\varepsilon}{4}\right) + \frac{1}{4}O \right\rfloor.$$

If, however, the investigated difference exceeds the threshold s the prediction is preferably instead calculated as $$\hat{U} = \left\lfloor \frac{2T+\alpha+\varepsilon}{4} \right\rfloor.$$

A corresponding procedure is conducted in case the second prediction direction is selected in step S6, i.e.

$$\hat{U} = \left\lfloor \frac{3}{4} \times \left(\frac{P+Q+2M}{4}\right) + \frac{1}{4}O \right\rfloor \text{ if } \left| \left\lfloor \frac{P+Q+2M}{4} \right\rfloor - O \right| < s$$

otherwise $$\hat{U} = \left\lfloor \frac{P+Q+2M}{4} \right\rfloor.$$

The threshold s can be determined in a manner similar to the variance threshold $T_{v_1}$ discussed above.

The method then continues to step S9, where a guiding bit associated with the selected prediction is provided. Thus, if the prediction is calculated according to step S7 and property values in the first direction, the guiding bit could be set to $0_{bin}$ (or $1_{bin}$). However, if instead the prediction is calculated based on property values in the second direction in step S8, the guiding bit could be $1_{bin}$ (or $0_{bin}$).

A next step S10 calculates a prediction error based on the property value of the current subblock and the prediction provided in step S5, S7 or S8. The prediction error $\tilde{U}$ is preferably calculated as a difference between the property value U and the prediction $\hat{U}$, $\tilde{U}=U-\hat{U}$.

An encoded representation of the calculated prediction error is determined in step S11. The compressed or encoded representation of the block then comprises this encoded representation and, if the method continued from step S4 to step S6, the guiding bit provided in step S9 for the subblock.

In a typical implementation that uses quantization in the compression, the quantization and dequantization is heavily active in the prediction stage. The reason for this is that it is important for the prediction that the compression operates with the same surrounding pixels as in the decompression. In such a case, the residual, i.e. prediction error, is generally quantized and immediately dequantized and this "decoded" value is used hereinafter in subsequent predictions.

The procedure is preferably repeated for multiple pixels and subblocks in the block, which is schematically illustrated by the line L2. In such a case, the pixels and subblocks are preferably processed in scan-order such as row-by-row starting from the first row. However, in such a case it can be possible that predictions have not yet been calculated for preceding neighboring pixels and subblocks. For instance, when processing the subblock U according a row-by-row scan order only pixels and subblocks A to T have already been processed but not the pixels V to $\varepsilon$ in FIG. 2. However, it is always possible to traverse the pixels and subblocks in a manner that each pixel and subblock has all its upper and left neighbors already processed. Given the particular quadtree structure for the block 2, this would result in the order: A, B, F, G, C, D, E, H, J, J, K, L, N, O, P, Q, M, R, S, V, W, T, X, Y, Z, $\alpha$, $\beta$, $\gamma$, $\delta$, $\varepsilon$, U.

Repeating the compressing method according to the line L2, the compressed block comprises a respective encoded prediction error representation for each of the pixels and subblocks, the property value of which have been predicted. In addition, some of the pixels/subblocks may have an assigned guiding bit, some may have multiple guiding bits as is discussed further herein, while others have predictions calculated according to step S5 and therefore do not have any assigned guiding bits.

Figure 3:
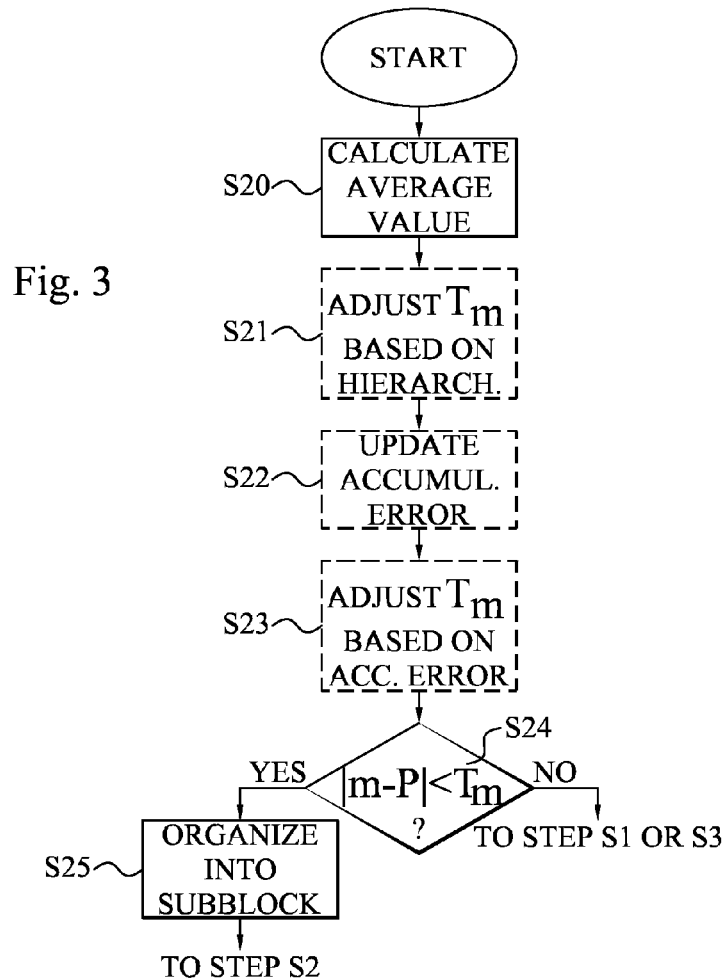
FIG. 3 is a flow diagram illustrating an embodiment of the subblock defining step of FIG. 1.

FIG. 3 illustrates an embodiment of the hierarchically defining step S1 of FIG. 1. The method starts in step S20, where the average value of the property values of a subset, preferably n×n, pixels or subblocks is calculated. In an optional embodiment, a threshold value $T_m$ is adjusted based on the level of the quadtree of the current subblock. Preferably, the threshold should be lower the higher up in the hierarchy the current subblock is. That is, in order to sub-sample a region covering more pixels, "the more flat" it has to be, if the introduced errors per pixel are to be consistent. This also reduces block artifacts. In an embodiment, the threshold has value $T_m$ at the lowest level, i.e. investigating a set of pixels. However, at the next level a set of first level subblocks is investigated. In the case the threshold preferably has value $$\frac{T_m}{n \times n}.$$

Thus, the value is divided by the number of pixels organized into a subblock. Preferably, the threshold is defined as $$\frac{T_m}{(n \times n)^{l-1}},$$

where l represents the hierarchical level of the possible subblock.

In the case where each pixel has a luminance component and chrominance components, different threshold values can be used, i.e. the flatness threshold for the luminance component is preferably lower than the corresponding thresholds for the chrominance components. Again, the reason for this is that the human visual system is more susceptible to errors in the luminance components.

Sub-sampling pixel or subblocks may lead to an increase in the accumulated error for the compressed block. In order to prevent, during a lossy compression, this accumulated error to be too large, the flatness threshold can be updated based on the accumulated error. In such a case, the method continues to step S22, where an error value indicative of the error in representing the property values of the subset of pixels or hierarchically subblocks with the defined subblock having a single property value. In a simple embodiment, the error value can be calculated as the sum of the absolute difference between the individual property values of the pixels/hierarchically lower subblocks and the determined property value for the (hierarchically higher) subblock. More elaborated embodiments that compresses the subblock, decompresses it again and then calculates the sum of the absolute difference between the original pixel values and the resulting decompressed values could instead be used.

In either case, the accumulated error associated with the block and indicative of approximation errors introduced during the compression of the block is updated based on the calculated error value. The updated accumulated error can be used to provide an adaptive thresholding in step S23 so that the higher the accumulated error is in the block, the lower the threshold. This allows usage of lossy compression more often. The net effect is that newly introduced errors will be smaller and smaller the closer to a maximum accumulated error we get. More importantly, the compression can continue to introduce small errors, without having to revert to the much more expensive (in terms of number of bytes) lossless mode. For instance, if the accumulated error has reached X %, such as 50% of the maximum allowable accumulation error, the flatness threshold $T_m$ is reduced by a given factor, such as by two. Alternatively, different levels of the flatness threshold can be used for instance dependent on whether the accumulated error is below 25%, in the interval 25-50%, in the interval 50-75% or more than 75% of the maximum error. During lossless compression, the flatness threshold has a value of zero, i.e. sub-sampling is only allowed in the regions having exactly the same property value.

A next step S24 investigates whether the absolute difference between the calculated average value and the property values of the set of pixels or subblocks is lower than the (adjusted) threshold. If any of the pixels or subblocks has a property value differing significantly from the average value, the subset of pixels or subblocks is not regarded as homogenous enough to be sub-sampled into a subblock or a higher level subblock. The method therefore continues to step S1 of FIG. for testing a new subset of pixels or subblock or to step S3 of FIG. 1 for determining the property value of the subblock.

In an alternative implementation, the sum of the absolute differences is compared to a threshold value. If the sum is lower than the threshold, the subset of pixels or subblocks can be sub-sampled into a subblock or a higher level subblock.

If the respective absolute differences are smaller than the threshold, the subset of pixels or subblocks is deemed homogenous enough to sub-sample them into a hierarchically higher subblock in step S25. This means replacing the respective individual property values of the sub-sampled pixels or subblocks with a common property value. This common property value is preferably the average value calculated in step S20. Other useful examples could be the median of the property values of the subset of pixels/subblocks.

Furthermore, a binary tree code describing the structure of the quadtree is determined for the block. For an 8×8 block, the tree code varies between 1 and 21 bits. A full tree, i.e. no subblocks are defined, uses 21 bits (1+4+16) and the smallest tree is to use a single bit indicating that the 8×8 pixel block is sub-sampled to a single value. The tree code is stored in the compressed block representation. In this tree code, $1_{bin}$ preferably indicates that the subblock has children, while $0_{bin}$ means that the node is a leaf. The tree code for the pixel block 300 in FIG. 2, therefore becomes 1 1110 1010 1101 $1011_{bin}$.

This is a good representation of the quadtree if we are interested in a low average bit rate, since simple blocks will be able to have a very small code, whereas complicated blocks (that are likely to be less prevalent) are getting longer codes. However, in some cases, the average bit rate is not of interest, but rather whether the bit rate is lower than a certain threshold. A block that is fully subdivided (all blocks of size 1×1 pixels) will be very expensive to encode. Therefore it may sometimes be a good idea to let this code be very cheap, say one bit. In such a description, it would be the blocks that are not subdivided at all (a single value per 8×8 block) that will have long codes. In that case, however, it may be ok since such a block will not take up many bits anyway. Such an alternative implementation may make it easier to have a majority of the blocks under a certain bit size.

Therefore, in an alternative embodiment, a fully subdivided quadtree (ever subblock is of size 1×1 pixels) could be given a short code, in order to compensate for the fact that such blocks are anyway very expensive to code. Conversely, a non-subdivided block (a single value per 8×8 block) would get a long code, which would not be of much harm since such a block would be very inexpensive to code anyway. Such an alternative embodiment may make it easier to have a majority of the blocks be under a certain bit size.

The method then continues to step S2 of FIG. 1, where the property value for the organized sub-block, preferably as the average or median of the property values of the sub-sampled pixels.

Figure 4:
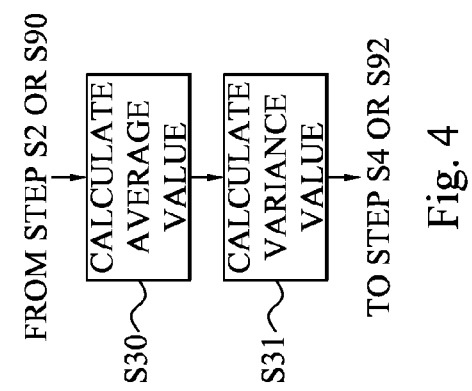
FIG. 4 is a flow diagram illustrating an embodiment of the variance representation determining step of FIGS. 1 and 12.

FIG. 4 is a flow diagram illustrating an embodiment of the determination of the variance representation in step S3. The method continues from step S2 of FIG. 1. A next step S30 calculates a representation of the average of the property values of the neighboring pixels and subblocks in the first and second prediction directions. The variance representation is then calculated based on the sum of respective absolute differences or squared differences between the average value representation and the property values of the neighboring pixels and subblocks as previously described. The method thereafter continues to step S4 of FIG. 1.

One of the most important things when predicting color or depth buffer data is not to predict over discontinuity edges. For instance, if we draw a mostly green triangle over a black background some blocks will contain both green and black pixels. Whereas prediction from green to green pixels works well and from black pixels to other black pixels also works well, it is not good to predict between green and black pixels since their values differ so much. This is avoided by using the prediction previously described in connection with steps S3 to S9 of FIG. 1.

However, the prediction can be improved even further. Assume that the pixel Q and subblock U of FIG. 2 have fairly similar property values, such as being substantially green, while the other neighboring pixels P, $\alpha$, $\epsilon$ and subblocks M, T are mostly black.

In this case, the variance value will exceed the threshold as pixel Q differs so much from remaining neighboring pixels and subblocks. The prediction is therefore to be conducted based on the property values in one of the directions. It is evident in the present case that the second prediction direction i.e. involving P, Q and M will be selected as their average is closer to the property value for U than the average of T, $\alpha$, $\epsilon$ in the first direction.

In such a case, the prediction of property value for U would be equal to the average of P, Q and M, i.e.

$$\hat{U} = \left\lfloor \frac{P+Q+2M}{4} \right\rfloor.$$

Figure 5:
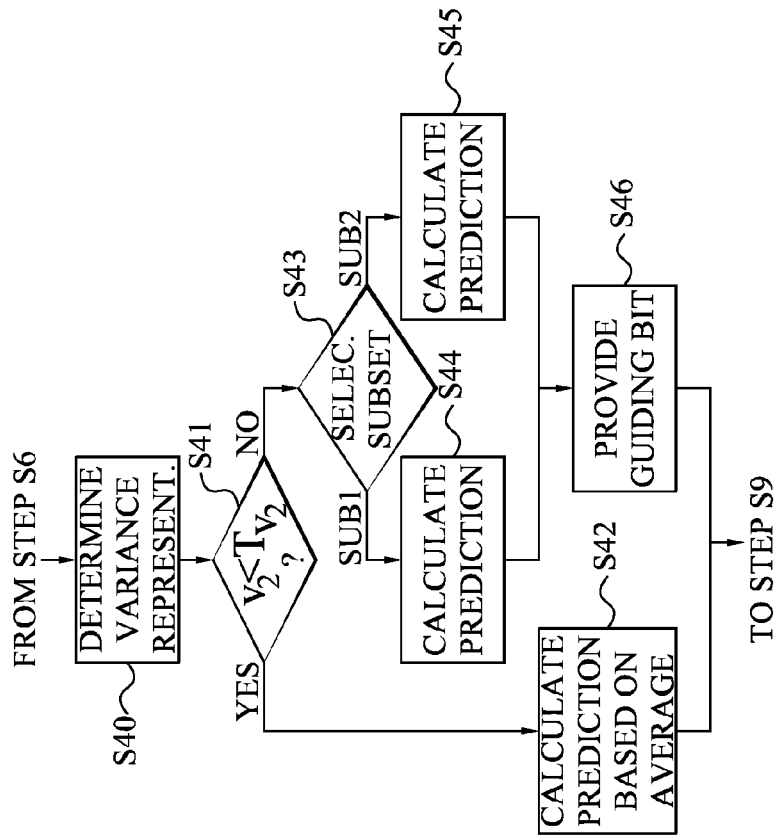
FIG. 5 is a flow diagram illustrating an embodiment of the prediction calculating steps of FIG. 1.

However, that average is between one value, Q, that is close to U and three values P, M, M that differ much from U. This situation can be solved by an embodiment of the invention illustrated in FIG. 5.

The method continues from step S6 of FIG. 2, where the most accurate prediction direction has been selected. A next step S40 determines a second variance representation of the property values of the neighboring pixels P, Q and subblock M in the selected prediction direction. This step S40 preferably involves calculating the average of these neighboring property values:

$$m_2 = \left\lfloor \frac{P+Q+2M}{4} \right\rfloor.$$

The variance value is preferably calculated as the sum of the squared or absolute differences between the calculated average and the individual property values in the second prediction direction: $v_2=(m_2-P)^2+(m_2-Q)^2+2(m_2-M)^2$. This second variance representation is compared to a second variance threshold $T_{v_2}$ in step S41. If the variance is smaller than the threshold, the prediction of subblock U is calculated based on the average $m_2$ or based on a weighted combination of the average $m_2$ and the pixel value O in the third prediction direction in step S42.

However, if the variance value exceeds the threshold as it probably will in the present example, the method continues to step S43. This step S43 involves selecting a relevant subset to be used as prediction basis, i.e. the first two pixel positions in the prediction direction or the last two positions. An average of the two first pixel positions is preferably calculated $$m_3 = \frac{P+Q}{2}$$

and for the two last positions $$m_4 = \frac{M+M}{2}.$$

The respective average values are then compared to the property value of the subblock U and the average being closest to U is selected in step S43. In the present case, the first average $m_3$ will be selected as one of its input values Q is close to U but none of the input values of the second average is close to U.

Thus, if $||m_3|-U|<||m_4|-U|$ the method continues to step S44, otherwise it continues to step S45. In the present example, the method continues to step S44, where the prediction of the property value U is calculated based on at least one of the property values in the selected subset. In a first embodiment, the prediction $\hat{U}=m_3$. In a second embodiment, a further investigation round according to step S40 is conducted as the selected subset contains more than one pixel or subblock. Thus, step S40 calculates yet another variance representation $v_3=(P-\lfloor m_3 \rfloor)^2+(Q-\lfloor m_3 \rfloor)^2=(P-Q)^2$. This representation is compared to a third variance threshold. If the variance is below the threshold, the prediction is calculated as $\hat{U}=\lfloor m_3 \rfloor$ or $\hat{U}=w_3\lfloor m_3 \rfloor+w_4 O$. However, if the variance exceeds the threshold as is highly likely in the present case, the method continues to step S43. The respective property values of the two pixels P, Q in the subset is compared to the value U. If $(P-U)^2<(Q-U)^2$, the method continues to step S44 otherwise it continues to step S45. In the present case, step S45 will be selected resulting in $\hat{U}=Q$ or $\hat{U}=w_3 Q+w_4 O$.

Furthermore, guiding bit(s) indicating which subsets that have been selected to reach the target prediction are provided in step S46. In the present case, a first guiding bit $1_{bit}$ first indicates that the second prediction direction was selected. A second guiding bit $0_{bit}$ designates that the first subset P, Q was selected in the second round and finally a third bit of $1_b$, indicates that in the third round, the property value of Q was selected as prediction. Thus, a subblock can be associated with zero, one, two or three guiding bits for a 8×8 block depending on the particular selected prediction.

The maximum number of rounds in which even finer selection of prediction basis according to above is defined by the hierarchical level of the subblock in the tree structure, which determines the maximum number of neighboring pixel positions the subblock has. Alternatively, a maximum number of rounds could be predefined.

Another problematic block layout regarding prediction is the case where, for instance, pixels Q, $\alpha$ have the same property values and pixels P, $\epsilon$ and subblocks M, T have the same values. Further assume that the property value of U is equal to or close to pixels Q, $\alpha$. This case will be correctly handled by the predictor using the variance representation of the present invention.

However, if another variance representation is employed that merely involves comparing the respective average values of the property values in the two prediction directions, a non-optimal prediction will be selected in this case. Thus, assume that the variance measure is determined as $$\left| \left\lfloor \frac{P+Q+2M}{4} \right\rfloor - \left\lfloor \frac{2T+\alpha+\varepsilon}{4} \right\rfloor \right|,$$

the measure will be zero and the predictor will select $$\hat{U} = \left\lfloor \frac{P+Q+2M+2T+\alpha+\varepsilon}{8} \right\rfloor.$$

Thus, calculation of the variance in property values by summing the absolute difference or squared difference between the average in the two directions and the neighboring property values in the two directions will better handle some problematic blocks that a simple comparison of average values will not handle effectively.

Figure 6:
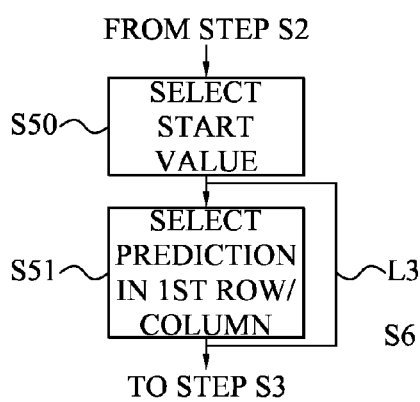
FIG. 6 is a flow diagram illustrating additional steps of the block compressing method.

FIG. 6 is a flow diagram illustrating additional steps of the compression method. The method starts in step S50, which comprises selecting a start property value for the block. This start value is selected to be the property value of a pixel or subblock at a selected or predefined position in the block. With reference to FIG. 2, a preferred implementation of such a predefined position is to use the first pixel position of the block, i.e. occupying the upper left corner. Other examples of possible start positions could be any of the other block corners. Actually any predefined position in the block could be used as start position although a corner position, and in particular the upper left corner pixel, significantly simplifies the compression of the block.

The compressed block comprises a representation of the start property value.

A next step S51 selects predictions to at least one remaining pixels or subblock belonging to the same row or column in the block as the start pixel. In a preferred implementation, this involves selecting property value prediction to be equal to the property value of the previous neighboring pixel or subblock in the row or column of the block. This means that for a pixel B in FIG. 2, $\hat{B}=A$, $\hat{F}=A$. Step S51 is preferably performed for each remaining pixel or subblock of the first row and first column, schematically illustrated by the line L3. In the case of a subblock, such as C and H present in the first pixel row and column, respectively, there is a choice to define the prediction based on the average of the two preceding pixels (in traversal order) or one of the pixels. Thus, $$\hat{C} = \left\lfloor \frac{B+G}{2} \right\rfloor,$$

$\hat{C}=B$ or $\hat{C}=G$. This situation will be correctly handled by the previously described predictor and the usage of guiding bits to discriminate between the two latter cases. For the remaining subblocks and pixels in the first row and column, the prediction is equal to the value of the preceding pixel or subblock: $\hat{D}=C$, $\hat{E}=D$, $\hat{R}=H$, $\hat{V}=R$ and so on.

In an alternative embodiment, it is possible to predict from not only the previous pixel but also from the one preceding that. For instance, if we have the pixels on a row A B C, it is possible to predict C as $\hat{C}=2B-A$, for instance.

The method then continues to step S4 of FIG. 1, where remaining pixels and subblocks in the block, i.e. not present in the first row or column, are compressed as previously described.

Figure 7:
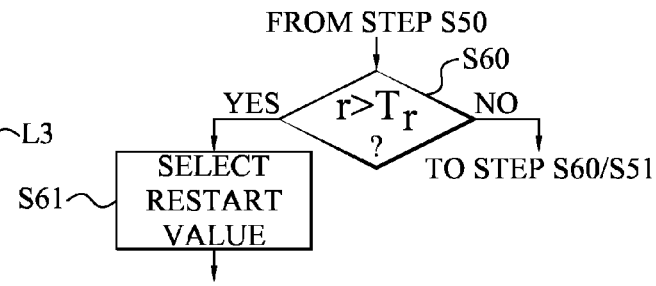
FIG. 7 is a flow diagram illustrating additional steps of the block compressing method.

Color and depth buffer compression differs from other image compression in that there may, as previously mentioned, be an unnaturally sharp discontinuity between a rendered triangle and pixels belonging to the background or to a previously rendered triangle of a very different color or depth. There can therefore be a discontinuity edge in the block. In such a case, a so-called restart property value can be determined and employed. FIG. 7 illustrates this concept in more detail. The method continues from step S50 of FIG. 6. A next step S60 investigates whether the property value of current pixel or subblock should be regarded as a restart property value for the block. The investigation is preferably based at least partly based on the property value of the pixel or subblock.

A first embodiment compares the prediction error of the pixel with an error threshold. Thus, if $r=\tilde{P}=|\hat{P}-P|\leq T$, the method returns to step S60 in order to investigate a next pixel or subblock or, if all such pixels and subblocks of the block have been tested, the method continues to step S51 of FIG. 6.

However, if the prediction error exceeds the threshold, the current pixel or subblock is regarded as a restart pixel/subblock. The position of the pixel (a six bit position word for a block with 64 pixels) or the subblock (the upper left pixel position of the subblock) and the property value of the pixel or subblock are stored in the compressed block representation. The compressed block preferably also comprises an indication of the number of restart pixels determined for the block.

In a first embodiment, the restart property value is stored in uncompressed form. However, in order to reduce the size of the compressed block representation, the restart property values are preferably quantized to fewer bits. For instance, assume that the property values of the pixels are in the form of 16 bits (or 15 bits if the sign bit is ignored). In such a case, the restart values are quantized in the lossy mode into 8 bits if the accumulated error for the block following the error introduced by this quantization is less than X %, such as 50%, of the maximum allowable error. If the accumulated error, though, exceeds 50% of the maximum error, a lower quantization into, for instance, 12 bits is preferably employed. More than two different quantization levels can of course be used as previously described in connection with determination of the flatness threshold.

In an alternative approach, the prediction error for a current pixel or subblock is first encoded as described herein. If the resulting coded representation of the prediction error is large, i.e. longer than a predefined bit length threshold, the pixel or subblock is instead regarded as a restart pixel or subblock and its value and position are stored in the compressed block.

The method then continues back to step S60 for testing a new pixel or subblock or continues further to step S51 of FIG. 6.

FIG. 8 illustrates the concept of using start and restart values according to the present invention. The figure illustrates a pixel with quadtree structure as disclosed in FIG. 2 but also with the property values indicated as three different kinds of grey scales. The first pixel 312 in the block 300 is regarded as the start pixel and its value is stored as start property value in the block. Remaining pixels and subblocks that have the same white color as the start pixel can be predicted therefrom or form other white-color pixels and subblocks according to the illustrated prediction directions.

The current block 300 contains three so-called restart pixels 314, 316, 318. These pixels 314, 316, 318 have property values that cannot be efficiently predicted from the neighboring pixels in the first or second directions. For instance, pixel 314 have a medium grey only has white neighboring pixels. As a consequence, the prediction error for that pixel 314 will be very large, thereby exceeding the threshold $T_r$. The same applies to the pixel 316 and the dark grey pixel 318 only having one medium grey neighboring pixel.

The remaining pixels and subblocks in the block can be correctly predicted from neighboring pixels and subblocks according to the indicated directions and still only resulting in prediction error being smaller than threshold $T_r$.

In an alternative approach, the pixels are first sub-sampled into the highest level. This means that all (64) property values are averaged into only one value, the start value A'''. Then each 4×4 area (next highest level in the hierarchy) is defined as A", D', R" and U. With reference to FIG. 2, the first such subblock A" would cover the pixel positions occupied by pixels A, B, F, G, I, J, N, O and subblocks C, H, the second subblock D' occupies the positions of pixels K, L, P, Q and subblocks D, E and M, and so on.

The predictions of the property values are then calculated as previously discussed. For example, the prediction errors for the level two subblocks occupying the area of the first subblock A''' becomes: Ã"=A"−Â"=A"−A'''. The other subblocks at this level, D', R" and U, are predicted from A" (and optionally A''') or from neighboring values: D'=A" (or D̂'=ƒ(A", A''')), R̂"=A" (or R̂"=ƒ(A", A''')) and $$\hat{U} = \left\lfloor \frac{D' + R''}{2} \right\rfloor$$

or one of D', R" (or $$\hat{U} = f\left(\frac{D' + R''}{2}, A'''\right)$$

or one of ƒ(D', A'''), ƒ(R", A''')). Prediction errors for these subblocks D', R" and U are calculated as the difference between the property value and the predicted value, such as D̃'=D'−D̂'. We then move down one further level in the tree structure. The first subblock A" is therefore divided into four level one subblocks A', C, H, I', the second subblock D' is divided into D, E, K', M, the third subblock R" becomes R', T, X', Z'. However, the fourth subblock U has already reached its target hierarchical level according to the tree structure of FIG. 2.

Then each 2×2 area is averaged to only one value except for U, which is already finished. A' is predicted from A" and preferably A'''. C is predicted from A' and preferably A" and A''', H is predicted from A' and preferably A" and A'''. Finally I' is predicted from C and H and preferably A" and A''' or one of C and H and preferably A" and A'''. The same procedure is conducted for the other 2×2 areas in the block.

The level one subblocks are then split further into individual pixels unless the correct tree level has already been reached. For instance, the subblock A' is divided, according to FIG. 2, into four individual pixels A, B, F, G. The prediction error for pixel A is calculated as the difference between its property value and its prediction as preferably determined from A', A" and A'''. The other pixels B, F, G are then predicted from this value A or from each other and preferably using A', A" and A'''.

It is important to realize that the predictor on the encoding side should behave in the same way as on the decoding side. For this reason, pixels are at all times modified to be decoded (lossy) values while predicting. This means that, in the predictor, we do quantization, store the value for further entropy encoding and then do an inverse quantization to get the decoded value back. In the lossy mode, the residual values are preferably quantized. In a preferred embodiment, a uniform quantizer is used where the quantization step is dependent on which sub-sampled area the current pixel is in. This means that the more flat the region, the gentler the quantization. This is done to reduce the amount of introduced errors with the motivation that these sub-sampled values represent more pixels, and therefore the amount of quantization should be reduced in order to be consistent.

FIG. 9 is a flow diagram illustrating an embodiment of the quantization. The method continues from step S10 of FIG. 1. A next step S70 determines an error weight $w_E$ based on the accumulated error associated with the block. In a preferred embodiment, if the accumulated error is lower than X %, such as 50%, of the maximum allowable accumulated error the error weight has value $w_E$. However, if the accumulated error exceeds 50% of the maximum error but of course is lower than the maximum error (if it would be higher than the maximum error, we would revert to lossless compression), the error weight has value $w_E/z$, where z is a positive number larger than one, such as two. More than two different levels of the error weight can be used.

In an alternative embodiment, the error weight may depend continuously on the accumulated error using a monotonously decreasing function. For instance, the error weight could be defined as $w_E \times e^{-2\ ln(z)y}$, where $y \in [0, 1]$ is defined as the quotient between the accumulated error and the maximum allowable error. Other monotonously decreasing functions may instead be used that allows a milder compression the closer the maximum error we are.

A next step S71 determines a hierarchical weight $w_H$ based on whether the current subblock is a first or higher level subblock. Thus, for a pixel the weight value is $w_H$ and a l level subblock has weight value $$\frac{w_H}{(n \times n)^l}.$$

The quantization parameter to use for the current pixel or subblock is then calculated in step S71 based on the determined error weight and the hierarchical weight. In a preferred embodiment, the quantization parameter is expressed as $$q = q_{basic} \frac{w_E \times w_H}{(n \times n)^l} \text{ or } q = q_{basic} \frac{w_E \times w_H}{(n \times n)^l \times z}$$

depending on whether the accumulated error exceeds 50% of the maximum error or not and where l=0, 1, 2 depending on the hierarchical level and where l=0 for individual pixels.

The prediction error P̃ is thereafter quantized with the calculated quantization parameter in step S73, preferably as $$\tilde{P}_q = \tilde{P} >> q = \frac{\tilde{P}}{2^q}.$$

The residual value after quantization is then encoded, preferably entropy encoded for further compression in step S74.

The entropy encoding is preferably preceded by a modification of the quantized prediction error to get a positive predictive error. This modification preferably involves applying the function n(x)=−2x to negative prediction errors (including zero errors) and the function p(x)=2x−1 to positive ones (excluding zero errors). This will result in a new arrangement of prediction errors as {0, 1, −1, 2, −2, 3, −3, . . . }, which means that numbers of small magnitudes will have small values. Each modified prediction error is then preferably Golomb-Rice encoded to obtain the encoded representation.

The Golomb-Rice encoding involves searching for an exponent number k. A single exponent number can be used for the whole block, or separate numbers can be used for different sets of at least one pixel or subblock. An exhaustive search among available values of k, such as between 0 and 15 can be used to find the best k for the group. However, if four or less values are to be encoded, the search can be computationally reduced by only looking at a selected portion of the available k values. This preferred k searching comprises searching for a k in an interval of [p-4, p], where p is the bit position of the most significant bit of the largest prediction error of the block or the limited pixel/subblock set.

The prediction errors are then divided by $2^k$ to form a respective quotient and a remainder. The quotients are unary encoded, preferably by using the unary code according to Table 1 below.

TABLE 1 unary codes

| Unary code | Quotient |
|---|---|
| $0_{bin}$ | 0 |
| $10_{bin}$ | 1 |
| $110_{bin}$ | 2 |
| $1110_{bin}$ | 3 |
| $11110_{bin}$ | 4 |
| ... | ... |

Unary encoding assigns longer codes to larger values as is evident from Table 1. Generally values larger than 31 are encoded using $0xffff_{hex}$, followed by the 16 bits of the value.

The encoded representation of the prediction error comprises the unary code and the k bits of the remainder. In addition, the value k is stored in the block. This procedure is performed for each pixel and subblock in the block with the exception of the start property value and, optionally, the restart property value(s).

Even though Golomb-Rice coding is a possible coding algorithm that can be used, the present invention is not limited thereto. Instead other coding algorithms, including Huffman coding or Tunstall coding, can alternatively be employed.

An alternative to the adaptive uniform quantizer is to have a non-linear mapping function instead. When the predictor works well, the residual prediction error is small (i.e. distributed around zero). Since these small residuals compress well using an entropy encoder such as Golomb-Rice it may not be necessary to quantize these small values further. When the prediction errors grow, the predictor is not performing well and this is normally due to areas with large variations between the pixels. Since it is possible to use a coarser approximation in these regions, a non-linear mapping function can be used.

The non-linear mapping function is preferably linear up to a configurable point $T'_r$, such as four. Above this value it is non-linear. A non-limiting example is to use a square root function that in practice introduces a gradually higher quantization the higher the prediction error. An important property of the function is that it is reversible (however lossy) so that we can get an approximate but reasonably correct value back.

FIG. 10 is a flow diagram illustrating usage of such a non-linear function according to an embodiment. The method continues from step S10 in FIG. 1. A next step S80 investigates whether the current prediction error r is smaller than the threshold value $T'_r$. If the prediction error is indeed smaller than the threshold, the linear portion of the non-linear function is used, i.e. the quantized prediction error is $w_2 r$ in step S81, where $w_2$ is some defined weight, such as equal to one. However, if the prediction error exceeds the threshold, the non-linear portion of the function is used to calculate the quantized prediction error as $w_1 \lfloor T'_r + \sqrt{r - T'_r} \rfloor$ in step S82, where $w_1$ is some defined weight, such as equal to one.

The quantized prediction errors are then entropy encoded in step S83. This step S83 is preferably performed as previously described in connection with step S74 of FIG. 9.

FIG. 11 is a schematic illustration of a compressed representation 400 of a pixel block. The compressed block 400 preferably comprises a restart bit (not illustrated). This bit is set, i.e. equal to $1_{bin}$, if at least one restart pixel/subblock is used for the current block. In such a case, the compressed block also comprises an indication 430 of the restart pixel position(s) and a representation 420 of the restart property value(s). As the number of restart pixels in the block can vary for different blocks (from zero to multiple), the compressed block preferably also comprises an indication of the number of restarts pixels in the block.

A representation 410 of the start property value is also included compressed block 400. The compressed block 400 further comprises representations 440 of the determined k value(s), the guiding bits 450 and the unary code of the quotient and the remainders from the Golomb-Rice encoding, denoted encoded error representations 460 in the figure. Finally, the encoded block representation 400 also comprises the tree code representing the quadtree structure of the block.

The compressed block 400 preferably also comprises a representation of the accumulated error level for the current block.

The actual order of the included components of the compressed block 400 may differ from what is illustrated in FIG. 11.

In the case of RGB property values, a first color component, such as the red color component, can be compressed independently as previously described herein. The green (second) color components could though be encoded relative the red components. In such a case, respective component differences for each pixel and subblock in the block are determined. This component difference is a difference between the green and the red component of the pixels and subblocks. Thereafter a respective prediction for the second color components in the block is provided. This is performed as previously described with the exception that the difference between the green and red component is regarded as the property value for the pixels.

The same procedure is then performed for the blue (third) and remaining color component. However, in this case the difference between the blue and the green component is calculated and used as property value.

Handling luminance and chrominance components is, though, preferably done differently, implying that each component is handled and compressed independently basically by repeating the compression method described herein and disclosed in FIG. 1 for each of the components either in series or in parallel.

Decompression

Figure 12:
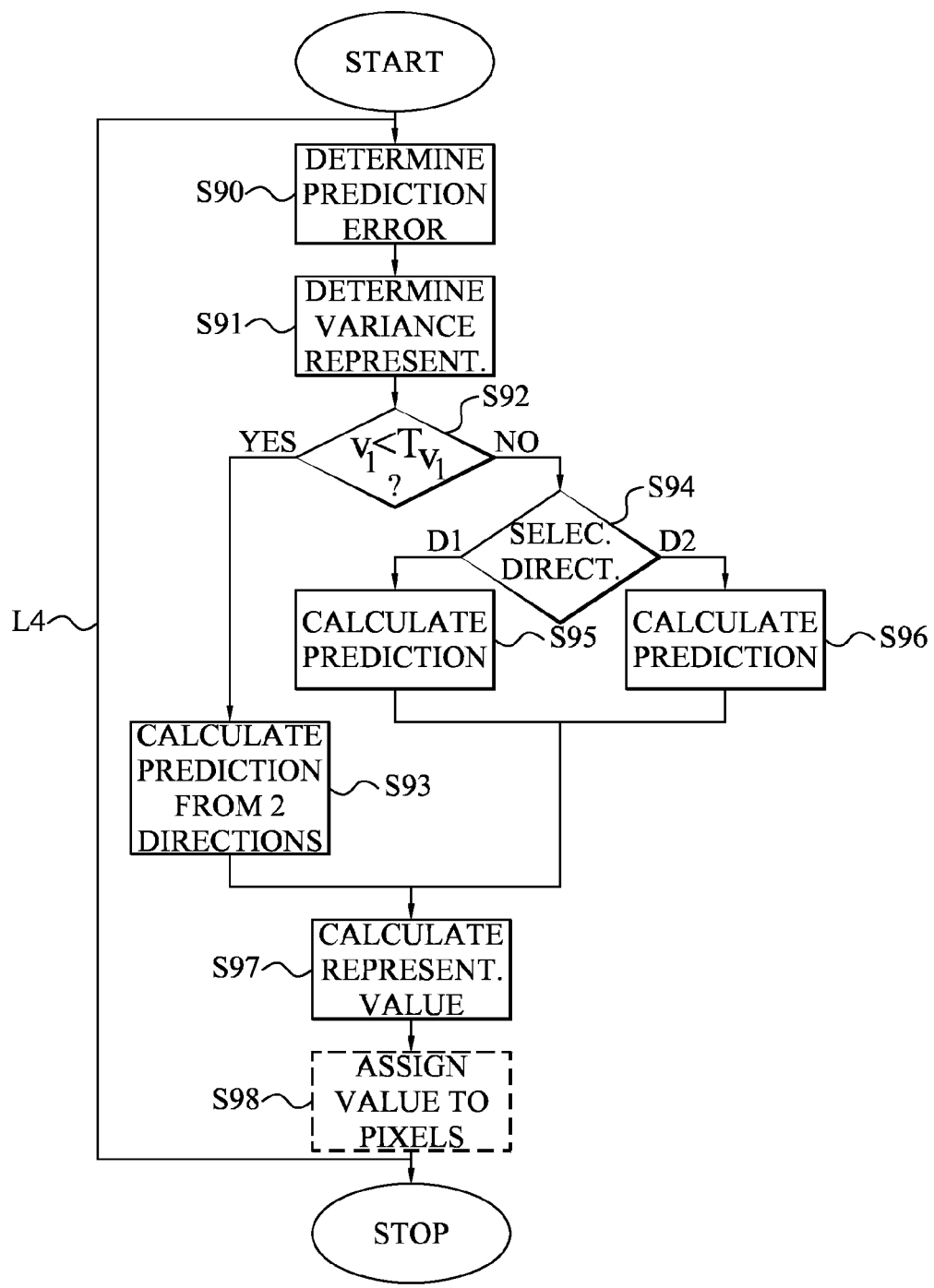
FIG. 12 is a flow diagram illustrating a block decompressing method according to an embodiment.

FIG. 12 is an illustration of a flow diagram showing a method of decompressing or decoding a compressed or coded pixel block. The method starts in step S90, where a prediction error is determined for a subblock of the block to be decoded. This prediction error is determined based on an encoded error representation associated with the subblock and included in the compressed block. Step S90 therefore involves utilizing the encoded error representation for calculating the prediction error.

The error determination is preferably performed by Golomb-Rice (or Huffman or Tunstall, for instance) decoding the encoded representation of the prediction error. In such a case, the prediction error preferably comprises a unary coded quotient, a remainder and an exponent value k. In such a case, the quotient can be obtained from the unary coded data using Table 1 above. Thereafter, the quotient and remainder forms a value that is multiplied by $2^k$ to form the prediction error.

A prediction of the (possibly) quantized version of a property value of the subblock is then provided. The prediction provision involves calculating a variance representation indicative of the difference in previously decoded property values of neighboring pixels and subblocks in the two prediction directions. This step S91 is performed as previously described in connection with step S3 of FIG. 1 and steps S30 and S31 of FIG. 4. The difference is compared with a predefined variance threshold in step S92, which is performed similar to step S4 of FIG. 1. If the difference is smaller than the threshold, the property value prediction is performed according to step S93 otherwise the method continues to step S94.

Step S93 calculates the prediction from the already decoded property values of pixels and/or subblocks in the two prediction directions, preferably based on the average of these neighboring property values. Step S93 is basically performed as previously described in connection with step S5 of FIG. 1.

If the variance representation is not smaller than the variance threshold as determined in step S92, step S94 investigates the (bit) value of the guiding bit associated with the coded subblock and included in the compressed pixel block. If the guiding bit has a first bit value, such as $0_{bin}$, the method continues to step S95. However, if the guiding bit instead has a second bit value, such as $1_{bin}$, the prediction provision is conducted according to step S96. Step S95 involves calculating the prediction based on at least one neighboring property value in the first direction, such as based on the average value of the neighboring pixels and subblocks in the first direction, based on the average value of a subset of the neighboring pixels and subblocks in the first direction or based on one of the property values of the neighboring pixels and subblocks in the first direction. Furthermore, the property value of a pixel or subblock in a third direction could be used together with the (average) value in the first direction, such as a linear combination of the two prediction direction as previously described.

In this case, the number of guiding bits assigned to the subblock defines how the prediction should be calculated. If only a single guiding bit is available, the prediction is calculated in step S95 preferably based on the average of all neighboring pixels in the first direction, possibly as a linear combination of this average and the property value of the pixel or subblock in the third direction if the difference between the average and property value is smaller than the threshold s. If the subblock is a first level subblock and it has two assigned guiding bits, the prediction is calculated based on one of the neighboring pixels in the first direction, optionally as linear combination of this pixel and the property value in the third direction if the difference therebetween is smaller than the threshold s. However, a second level subblock can, in addition to zero or one guiding bit, have two or three guiding bits. In the case to two bits, the prediction is determined as an average of the property values in two of the neighboring pixel positions in the first prediction direction. Three guiding bits signal that only one of the neighboring pixels in the first direction should be used, possibly together with the third direction property value, as prediction basis.

The discussion above applies mutatis mutandis to step S96 with the exception that the second prediction direction is used instead of the first direction.

The next step S97 calculates a representation of the property value of the subblock based on the prediction error determined in step S90 and the prediction provided in step S93, S95 or S96. This calculation is preferably implemented by adding the determined prediction error to the value prediction.

The calculated property value is then assigned, in step S98, to individual pixels of the subblock implying that all pixel positions occupied by the subblock (in turn defined by the hierarchical level of the subblock and the tree code) will be assigned this determined property value. This step S98 is of course not performed in the case of decompressing individual pixels of the compressed block.

The decompressing method of FIG. 12 is preferably repeated for each pixel and subblock in the block to be decoded, which is schematically illustrated by the line L4. This means that the method can be performed once or multiple times, such as once per pixel/subblock in block, for a given compressed block.

FIG. 13 illustrates an embodiment of the prediction calculating steps S95, S96 of FIG. 12. The method continues from step S94, where one of the first and second prediction directions has been selected based on the first associated guiding bit. A next step S100 determines a variance representation for the neighboring pixels/subblocks in the selected prediction direction. This variance representation is preferably calculated as previously described in connection with step S40 of FIG. 5. The variance representation is then compared to the second variance threshold in step S101, similar to step S41 of FIG. 5. If the calculated variance parameter is below the threshold, the prediction is calculated based on an average of the neighboring property values in the selected direction in step S102 as was done in step S42 of FIG. 5.

If the variance parameter instead exceeds the threshold in step S101, the method continues to step S103, where one of the two possible subsets in the selected prediction direction (in the case of a level two subblock) or where one of the two neighboring pixels in the selected direction (in the case of a level one subblock) is selected based on a second guiding bit for the subblock. The prediction is then calculated in step S104 or S105 based on the property value(s) of the selected subset or pixel. This procedure can be conducted once more in the case of a level two subblock having a further, third, guiding bit as previously described in connection with FIG. 5. The method then continues to step S97 of FIG. 12 where the property value is calculated based on the calculated prediction.

FIG. 14 is a flow diagram illustrating additional steps of the decompressing method. The method starts in step S110, which provides a property value of the start pixel/subblock in the block based on a representation of a start property value included in the compressed block. In a preferred embodiment, the start value is provided in uncoded form in the compressed block and can therefore be assigned directly as property value of the start pixel or to the pixels occupying the sub-block area of the start subblock. This pixel has a predefined positioned in the block as previously discussed.

Step S121 provides a prediction for a next pixel or subblock in the same pixel row or column as the start property value. The step S121 involves using the start property value as prediction for the neighboring pixel. The property value of the pixel/subblock is then determined based on this prediction and the prediction error determined for the pixel/subblock.

Step S121 is preferably repeated for the remaining pixels/subblocks in the first row and column, which is schematically by the line L5 in the figure.

FIG. 15 is a flow diagram illustrating additional steps of the decompression method in the case of at least one restart property value in the block. The method continues from step S110 of FIG. 14. A next step S120 investigates whether there is any restart pixel/subblock in the block and in such a case identifies the restart pixel/subblock. The compressed block preferably comprises a restart bit signaling whether the block comprises one or more restart values or not and preferably an indication of how many restart pixels there is in the block. The investigation of step S120 is therefore preferably performed based on such a restart bit. Furthermore, the compressed block preferably comprises a position word representing the pixel position of each restart pixel/subblock among the multiple pixel positions in the block. Step S120 preferably uses such position information in identifying the correct pixel position.

A next step S121 provides the property value of the restart pixel/subblock. The provision is performed based on a representation of a restart property value included in the compressed block. In a first implementation, the restart value is included in uncoded form and can therefore be assigned directly as property value of the restart pixel/subblock. In an alternative implementation the restart value(s) is (are) provided in quantized form and is (are) therefore first extended from the (8-bit or 12-bit) encoded representation(s) into the (15-bit or 16-bit) dequantized restart value(s). Thereafter the value(s) is (are) assigned to the relevant restart pixel(s) and/or pixel subblock(s).

The method then continues to step S111 of FIG. 14.

Comparative Experiment

An algorithm evaluation was done in a software-based simulation framework implementing a tiled rasterizer with a modern color buffer architecture, programmable shading, texture caching, Z-culling, and more. We have used a color buffer cache of 1 kB, and 256 bits for a tile table cache to store the tile table bits that indicate which compression mode is used (uncompressed, tile clear, compression mode 1 or compression mode 2).

In order for us to better understand the introduced error levels, we have used mean-square (MSE) errors between the incoming (original) tile and the same tile being encoded and decoded for the error control mechanism. This correlates well with established error metrics (e.g., mPSNR) when we measure error on the resulting final image. However, for a hardware realization, there would likely be lower complexity methods. For example, error gauging can be made on-the-fly directly inside the quadtree decomposition stage and the prediction stage. Less expensive error metrics (in terms of complexity) such as sum-of-absolute-differences (SAD) may be used instead of MSE.

While the properties of an algorithm, and its performance in terms of image quality and compression ratios can be evaluated using a software simulation, it is also important to investigate whether a hardware implementation is feasible. The different processing blocks have been designed with low complexity in mind. The $YC_oC_g$-transform consists solely of integer adders, subtracters and bit shifters and will incur a tiny cost in silicon. In order to reduce latency, many transform blocks can be executed in parallel. The quadtree decomposition method is also low complexity and highly parallelizable. In our predictor, a majority of the operations are bit shifters, adders and subtractors why the complexity is relatively small. In order to reduce latency, the predictor can be modified to execute in 4×4 pixel mode (with a slight performance penalty) instead of the 8×8 mode. Running four of these in parallel will reduce latency.

We believe the total complexity of a combined compressor and decompressor will be low enough even for a silicon implementation in embedded battery-driven devices like mobile phones.

We emphasize on the fact that the testing includes the full, incremental rasterization process of these scenes. This is in contrast to regular image compression, where only the final image is being compressed.

The test scenes are Water, Shadows, and Reflections, and all rendered targets are fp16 color buffers. To make certain that a large interval of the dynamic range is used, all scenes use fp16 texture maps and cube maps. In addition, the Shadows scene renders shadows using shadow mapping, and Reflections renders an fp16 cube map for every frame. The sphere in the center of the scene is rendered using reflections with this dynamic cube map.

In order to evaluate the error/quality of the final rendered images, we use HDR-VDP [4], log RGB, and mPSNR [5]. The HDR-VDP numbers presented in Tables 2-4 are given after a manual adjustment using the multiply-lum command increasing the luminance level to 300 cd/m$^2$.

We have compared our lossy compression algorithm against OpenEXR's B44A mode, both in terms of compression performance and quality. B44A is a lossy compressor, and it is the one that we found most amenable for hardware implementation. We have modified the B44A algorithm to include our error control mechanism. As a benchmark for our lossless method, we have used a modified version of the method [6]. The original method operates on 8×8-blocks, but divides this into four 4×4 blocks in order to enable parallel encoding. This has a negative impact on the compression efficiency, and in order to have a fair comparison we have implemented an 8×8 version. It works the same way, but only one base value and one restart value per 8×8 block are now used. Note that the image error/quality measures are only relevant for the B44A lossy compressor and our lossy compressor.

Tables 2-4 show the color bandwidth figures and the image quality/error measures for the three scenes rendered at 320×240 and 1024×768 resolutions. Note that we have tuned the thresholds of our algorithm so that the image quality/error measures are about the same for both the B44A (a lossy compressor) and our lossy compressor. As can be seen, our algorithm always outperforms the B44A algorithm. The present invention can be run according to a lossless compression simply by setting the flatness threshold equal to zero. This was done for the columns C in Tables 2-4, and as can be seen, our results are about the same as the lossless compressor presented [6]. It can be seen that the image error/quality measures of the rendered images have high quality overall, and hence, we believe that our algorithms make a significant contribution, since the compression factors are also rather high.

TABLE 2

Performance evaluation for scene Water

|  | A | B | C | D | E |
|---|---|---|---|---|---|
| Resolution |  |  | 320 × 240 |  |  |
| Color BW | 1.7 | 0.58 | 0.59 | 0.21 | 0.54 |
| mPSNR (dB) | — | — | — | 64.3 | 59.4 |
| logErr | — | — | — | 0.027 | 0.023 |
| HDR VDP | — | — | — | 0.00/0.00 | 0.00/0.00 |
| Compr factor | 1.0 | 2.8 | 2.8 | 8.1 | 3.1 |
| Resolution |  |  | 1024 × 768 |  |  |
| Color BW | 14.8 | 4.3 | 4.4 | 1.6 | 4.9 |

TABLE 2-continued

Performance evaluation for scene Water

|  | A | B | C | D | E |
|---|---|---|---|---|---|
| mPSNR (dB) | — | — | — | 68.8 | 62.1 |
| logErr | — | — | — | 0.021 | 0.023 |
| HDR VDP | — | — | — | 0.00/0.00 | 0.00/0.00 |
| Compr factor | 1.0 | 3.4 | 3.4 | 9.2 | 3.0 |

TABLE 3

Performance evaluation for scene Shadows

|  | A | B | C | D | E |
|---|---|---|---|---|---|
| Resolution | | | 320 × 240 | | |
| Color BW | 3.8 | 1.0 | 1.0 | 0.47 | 1.6 |
| mPSNR (dB) | — | — | — | 55.3 | 54.8 |
| logErr | — | — | — | 0.029 | 0.032 |
| HDR VDP | — | — | — | 0.00/0.00 | 0.01/0.00 |
| Compr factor | 1.0 | 3.6 | 3.9 | 8.1 | 2.3 |
| Resolution | | | 1024 × 768 | | |
| Color BW | 29.8 | 7.8 | 6.4 | 3.3 | 10.1 |
| mPSNR (dB) | — | — | — | 60.8 | 60.0 |
| logErr | — | — | — | 0.015 | 0.019 |
| HDR VDP | — | — | — | 0.00/0.00 | 0.01/0.00 |
| Compr factor | 1.0 | 4.1 | 4.6 | 9.0 | 2.9 |

TABLE 4

Performance evaluation for scene Reflections

|  | A | B | C | D | E |
|---|---|---|---|---|---|
| Resolution | | | 320 × 240 | | |
| Color BW | 4.9 | 1.7 | 1.8 | 0.6 | 2.8 |
| mPSNR (dB) | — | — | — | 54.3 | 51.2 |
| logErr | — | — | — | 0.028 | 0.038 |
| HDR VDP | — | — | — | 0.00/0.00 | 0.01/0.00 |
| Compr factor | 1.0 | 3.2 | 2.8 | 6.3 | 1.7 |
| Resolution | | | 1024 × 768 | | |
| Color BW | 29.3 | 7.2 | 9.0 | 3.2 | 15.0 |
| mPSNR (dB) | — | — | — | 55.7 | 54.1 |
| logErr | — | — | — | 0.024 | 0.023 |
| HDR VDP | — | — | — | 0.01/0.00 | 0.06/0.02 |
| Compr factor | 1.0 | 3.7 | 3.3 | 9.1 | 3.0 |

A = uncompressed
B = algorithm according to [6]
C = lossless algorithm according to the invention
D = lossy algorithm according to the invention
E = Open EXR B44A
Color BW = is the color buffer bandwidth measured in MB/frame
HDR VDP = is given as a/b, where a is the percentage of pixels where a human has 75% chance of detecting an error and b is corresponding percentage of pixels where a human has 95% chance of detecting an error.

Note that the parameters of the algorithm of the invention have been tuned so that the quality/error measures are approximately the same for column D and E. Since the quality is about the same, the compression factors can easily be compared.

Implementation Aspects

Figure 16:
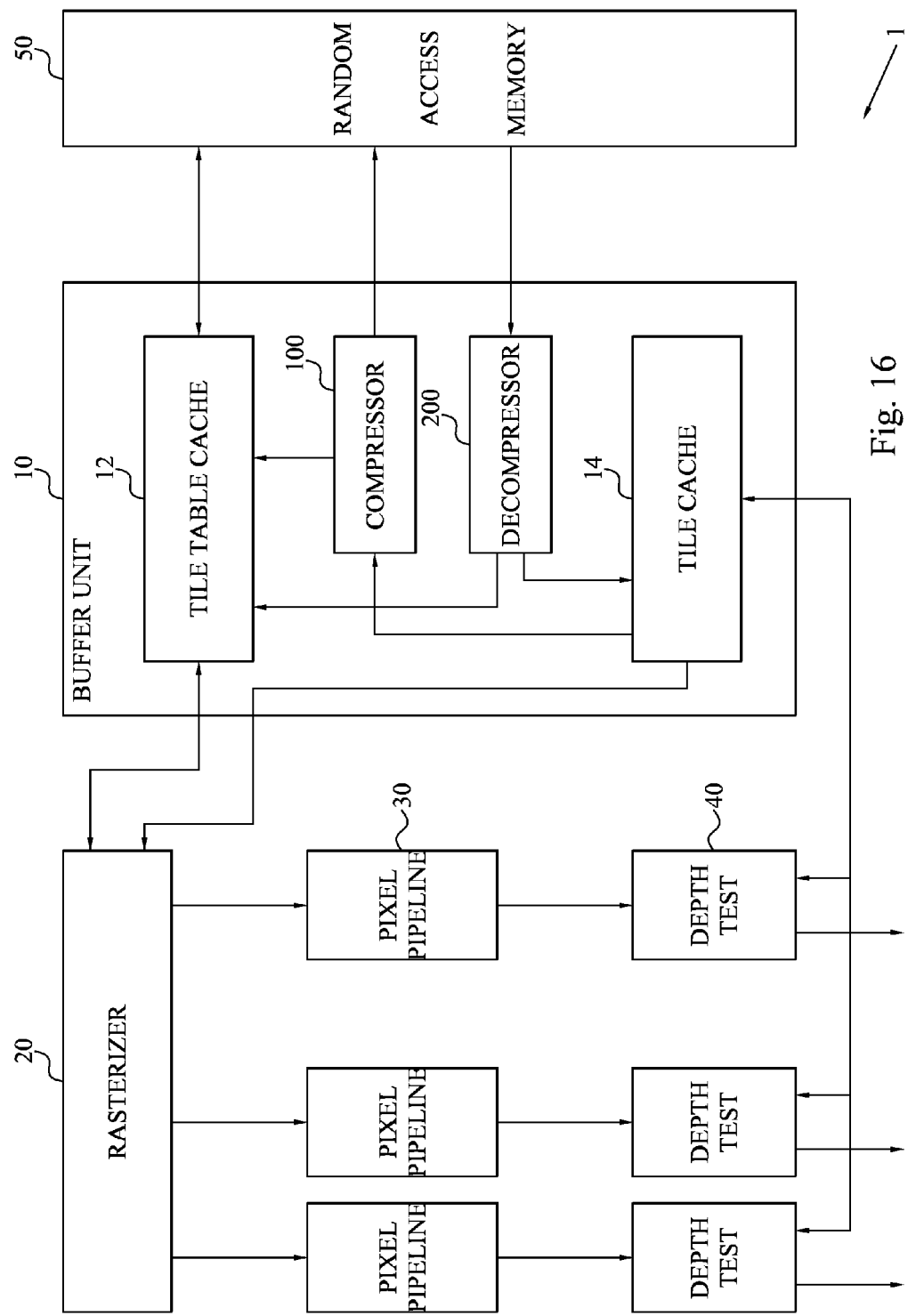
FIG. 16 is a schematic block diagram of a buffer architecture in which the compressor and/or decompressor can be implemented.

FIG. 16 is a schematic overview of a buffer architecture 1, to which the teachings of the embodiments can be applied. The architecture comprises a random access memory (RAM) 50 for storing pixel blocks comprising, among others, color buffers. A buffer unit 10 comprises a decompressor 200 according to the present invention for decompressing compressed blocks fetched from the RAM 50. The decompressed or decoded blocks are temporarily stored in an associated tile cache 14 of the buffer unit 10. A compressor 100 according to the present invention is also provided in the buffer unit 10 for compressing pixel blocks present in the cache 14 for storage in the RAM 50.

In a preferred embodiment, the buffer unit 10 also comprises a tile table cache 12. This table cache 12 stores header information associated with the pixel blocks but kept separately from the buffer data. The tile table entries typically contains flags signaling whether the associated pixel block is stored in uncompressed form or in a compressed form in the RAM 50. In the latter case, the flag preferably also signals the size of the compressed block, as different compressed blocks can have different total bit lengths. For example, a 2-bit flag can be used for signaling uncompressed block, compressed with compressed with 50% of original size, compressed with 25% of original size or fast-color-cleared.

A rasterizer or rasterizing unit 20 is connected to the buffer unit 10 and performs the actual rasterization of pixels. The rasterizer 20 is connected to one or multiple pixel pipelines 30 that are employed for computing the depth and color of a pixel. Each pixel pipeline 30 is connected to a depth testing unit 40 responsible for discarding pixels that are occluded, i.e. having a larger depth value, by previously drawn geometry. The order of the pixel pipelines 30 and the depth testing units 40 can be interchanged from what is disclosed in FIG. 16.

Compressor

Figure 17:
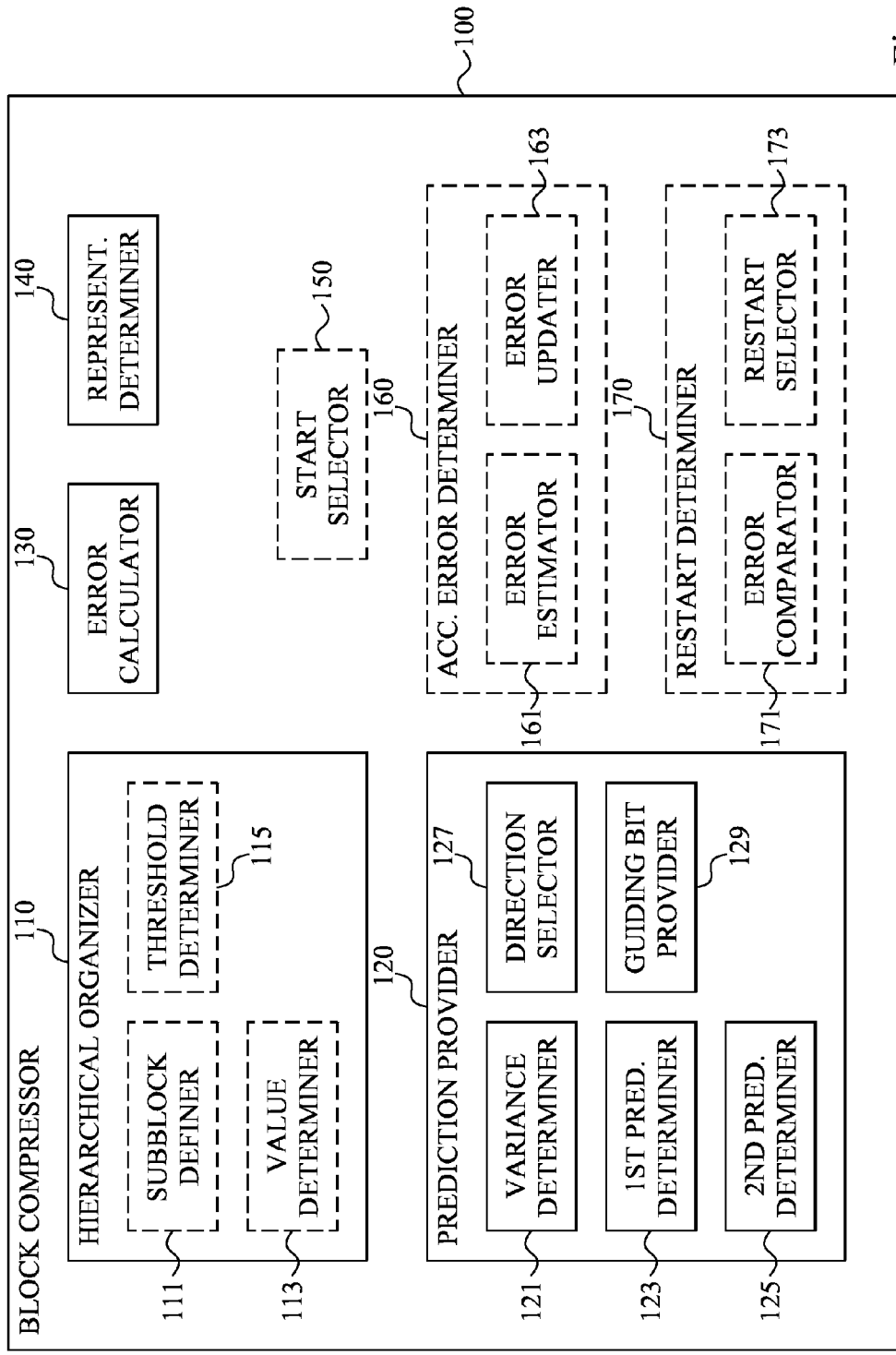
FIG. 17 is a schematic block diagram of a block compressor according to an embodiment.

FIG. 17 is a schematic block diagram of a compressor 100 according to an embodiment. The compressor 100 comprises a hierarchical organizer 110 for sub-sampling pixels of a pixel block to be compressed into pixel subblocks occupying the pixel positions in the block of these sub-sampled pixels. The organizer 110 comprises a subblock definer 111 for hierarchically defining a subblock in the pixel block based on the property values of the set of multiple pixels or hierarchically lower subblocks to be sub-sampled. In an embodiment, the subblock definer 111 first investigates all non-overlapping sets of pixels, such as 2×2 pixels, in the block and investigates whether the property values of these pixels are homogenous enough to entitle them to be sub-sampled into a first level subblock. Once all 2×2 sets of adjacent pixels have been tested in a first round, the subblock definer 111 moves up one hierarchical level and investigates sets of first level subblocks, such as 2×2 adjacent subblocks. If these are deemed homogenous they are sub-sampled into a second level subblock. This procedure is repeated until all pixel and subblock sets have been tested. The definer 111 also generates a so-called tree code descriptive of the resulting hierarchical tree structure to thereby determine whether the block or any subblocks has children or if the node is a leaf The compressed representation of the current block preferably comprises the tree code determined by the subblock definer 111.

A value determiner 113 of the organizer 110 determines a respective property value for the subblocks defined by the subblock definer 111. The property value is determined based on at least a portion of the property values of the sub-sampled pixels or (hierarchically lower) subblocks, preferably as an average of these multiple sub-sampled property values.

The block compressor 110 also comprises a prediction provider 120 for generating of predictions of property values for pixels and subblocks in the block. The prediction provider 120 comprises a variance determiner 121 arranged for determining, for a given subblock, a variance representation of property values of neighboring pixels and/or subblocks present in a first and a second prediction direction in the block relative the current subblock.

This variance representation is compared to a variance threshold. If the determined variance measure is below the threshold, a first prediction determiner 123 becomes operated and determines the prediction based on weighted combination of neighboring property values in both prediction directions. In a preferred embodiment, this weighted combination is an average of the property values of the neighboring pixels/subblocks in the two prediction directions.

Figure 20:
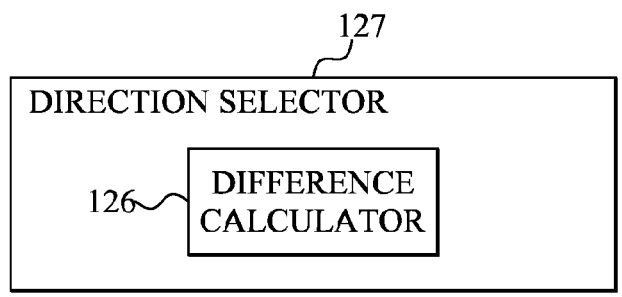
FIG. 20 is a schematic block diagram of an embodiment of the direction selector in FIG. 17.

However, if the variance measure is not smaller than the threshold, a direction selector 127 of the prediction provider 120 selects a prediction direction of the first and second directions. This selection is preferably performed based on respective comparisons of the property values of the current subblock and the property values in the first direction and in the second direction. More preferably, the direction selector calculates an average of the neighboring property values in the first direction and an average of the values in the second prediction. These two averages are then compared to the current property value and the prediction direction, the average property value of which that is closest to the current value, is selected. In such a case, the direction selector 127 preferably comprises a difference calculator 126 as is illustrated in the embodiment of FIG. 20 for calculating the two differences, which are then compared by the direction selector 127.

A second prediction determiner 125 becomes operated if the variance measure is not smaller than the threshold and determines the property value prediction based on at least one neighboring property value in the prediction direction selected by the direction selector 127. The prediction could be determined based on the average of all neighboring pixels/subblocks in the selected direction, based on the average of a subset of the neighboring pixels/subblocks or based on only one neighboring pixel/subblock in the selected direction as previously described. In order to discriminate between these possibilities, the variance determiner 121 can determine a second variance representation of the property values of the neighboring pixels/subblocks in the selected prediction direction. If this second variance is below a variance threshold, the first prediction determiner 123 determines the predication based on an average of all the neighboring values in the relevant direction, possibly also including the neighboring property value in a third prediction direction. However, if the variance measure instead exceeds the threshold, the second prediction determiner 125 determines the prediction based on a single pixel/subblock in the case of a first level subblock or a further test is made to see whether the prediction of the current subblock should be based on a subset of the neighboring property values in the relevant direction or only based on a single value in the case of a second and higher level subblock.

The prediction provider 120 also comprises a guiding bit provider 129 arranged for providing a guiding bit associated with the prediction direction selected by the direction selector 127. The direction selector 127 may be activated zero, one, two or three times for a second level subblock, implying that the guiding bit 129 can provide zero, one or multiple guiding bits for a subblock. These guiding bits 129 are stored in the compressed representation of the current block.

The compressor 100 also comprises an error calculator 130 for calculating a prediction error for a current subblock based on the property value of the subblock and the provided prediction from the provider 120. The error is preferably a difference between the property value and the prediction.

A representation determiner 140 processes the calculated prediction error to get an encoded error representation. The resulting compressed block comprises this encoded error representation for the current subblock and any guiding bit if employed.

Figure 18:
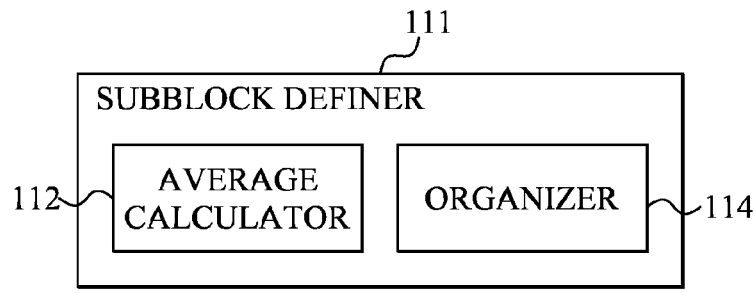
FIG. 18 is a schematic block diagram of an embodiment of the subblock definer in FIG. 17.

FIG. 18 is a block diagram illustrating an embodiment of the subblock definer 111 in FIG. 17. The definer 111 comprises an average calculator 112 for calculating an average value of the property values of the pixels or subblocks to potentially be sub-sampled into a (higher level) subblock. An organizer 114 compares the respective absolute differences between the calculated value and the property values of the pixels/subblocks with a difference threshold. If all the absolute differences are below the threshold, the organizer 114 sub-samples the pixels/subblocks into a subblock of higher level in the tree structure. The organizer 114 also updates the tree code accordingly.

The units 112 and 114 of the subblock definer 111 may be provided as software, hardware or a combination thereof. The units 112 and 114 may be implemented together in the subblock definer 111. Alternatively, a distributed implementation is also possible with some of the units provided elsewhere in the compressor.

The difference threshold used by the organizer in order to determine whether to perform sub-sampling or not for a set of pixels/subblocks is preferably determined by a threshold determiner 115 of the hierarchical organizer 110. This determiner 115 preferably adjusts the threshold value depending on the hierarchical level of the tentative subblock. Thus, the threshold value used for testing the average of a set of pixels is preferably higher than the corresponding threshold used for testing the average of a set of subblocks as previously described.

The threshold determiner 115 may also adjust the threshold depending on what type of property value to process. For instance, threshold values used in connection with luminance data are preferably comparatively lower than thresholds for chrominance data.

The threshold value may also be adjusted based on an accumulated error for the current block. In such a case, the block compressor 100 comprises an accumulation error determiner 160 comprising an error estimator 161. This error estimator 161 calculates an error value indicative of the error in representing the property values of the sub-sampled pixels/subblocks with the single property value calculated by the value determiner 113. An error updater 163 updates an associated accumulated error for the block to be compressed with the calculated error value from the estimator 161.

The threshold determiner 115 can then adjust the difference threshold based on the updated accumulated error, generally by decreasing the threshold value if the accumulated error exceeds a given percentage of the maximum allowable accumulated error for the block.

Figure 19:
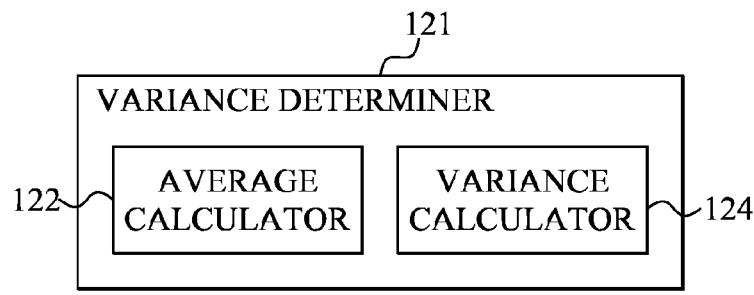
FIG. 19 is a schematic block diagram of an embodiment of the variance determiner in FIG. 17.

FIG. 19 is a schematic block diagram of an embodiment of the variance determiner 121 of the compressor in FIG. 17. The determiner 121 preferably comprises an average calculator 122 for calculating an average value of relevant input property values for neighboring pixels and/or subblocks. A variance calculator 124 then calculates the variance parameter based on respective squared or absolute differences between the average value and the individual neighboring property values.

The units 122 and 124 of the variance determiner 121 may be provided as software, hardware or a combination thereof. The units 122 and 124 may be implemented together in the variance determiner 121. Alternatively, a distributed implementation is also possible with some of the units provided elsewhere in the compressor.

The block compressor 100 preferably also comprises a start selector 150. The start selector 150 selects a start property value for the block, where this value is equal to the property value of a selected pixel or subblock in the block. This pixel/subblock preferably has a predefined pixel position in the block and preferably occupies the upper left pixel.

The compressed block representation comprises a representation of the start property value, preferably as an unquantized bit sequence.

The prediction provider 110 is arranged for providing predictions for pixels and subblocks present in the same row and column as the start pixel/subblock, preferably the first row and column. For these pixels/subblocks, the respective predictions are selected to be equal to the property value of the pixel/subblock having the immediate preceding position towards the start pixel/subblock in the same row or column as the current pixel or subblock.

The compressor 100 preferably also comprises a restart determiner 170 for selecting any restart property value for the block. The selector 170 preferably comprises an error comparator 171 for comparing the prediction error for a current pixel or subblock as determined by the error calculator 130 with a threshold error. If the prediction error exceeds the prediction error, the number of bits required for coding the error by the representation determiner 140 will be comparatively large, reducing the effectiveness of the block compression. In such a case, a restart selector 173 selects the current pixel or subblock to be a so-called restart pixel/subblock. Instead of predicting the property value of the pixel/subblock, an encoded representation of the property value, preferably in the form a quantized version of the property value, is stored in the compressed block together with a representation of the pixel position of the pixel/subblock in the block.

The units 110 to 173 of the block compressor 100 may be provided as software, hardware or a combination thereof. The units 110 to 173 may be implemented together in the compressor 100. Alternatively, a distributed implementation is also possible with some of the units provided elsewhere in the buffer architecture.

Figure 21:
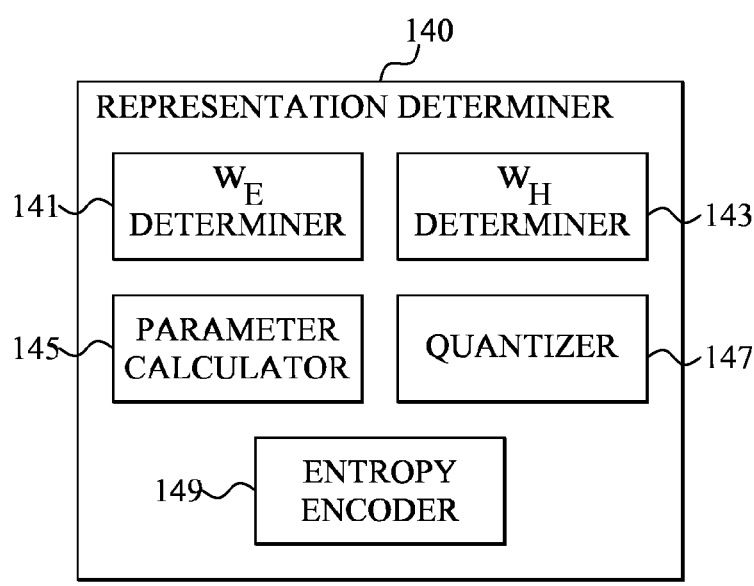
FIG. 21 is a schematic block diagram of an embodiment of the representation determiner in FIG. 17.

FIG. 21 is a schematic block diagram of an embodiment of the representation determiner in the block compressor of FIG. 17. This embodiment determines a quantization parameter, preferably an adaptive parameter, to use for quantizing the prediction errors calculated by the error calculator in the compressor. In such a case, the determiner 140 comprises an error weight determiner for determining an error weight based on the accumulated error associated with the block and calculated by the error updater of the compressor. In a preferred embodiment, the determiner 141 reduces the error weight if the accumulated error exceeds a predefined percentage of the maximum allowable accumulated error for the block.

Correspondingly, a hierarchical weight determiner 143 determines a hierarchical weight that is dependent on whether the prediction error relates to a single pixel or a subblock. In a preferred implementation, the weight value is reduced the higher up in the tree structure one comes, implying that the hierarchical weight for a pixel is larger than for a first level subblock, which in turn has a larger weight than a second level subblock, and so on.

A parameter calculator 145 then calculates the quantization parameter for the current pixel/subblock based on the determined error and hierarchical weights. A quantizier 147 quantizes the prediction error with the quantization parameter, typically by dividing the error with the parameter following by rounding or shifting the bit sequence of the prediction error a number of steps to the right defined by the quantization parameter.

The quantized prediction error is then entropy encoded by an entropy encoder 149 of the representation determiner 140. Preferably, the encoder first processes the quantized prediction error to get a positive prediction error as previously described, i.e. inputting the prediction error x into the function $n(x)=-2x$ for negative prediction errors (and zero value) and into the function $p(x)=2x-1$ for positive ones. The resulting modified prediction error is encoded, preferably by a Golomb-Rice coder. Generally, the encoder 149 searches for an exponent value k employed to get a number $2^k$, by which the modified prediction error is divided. An exhaustive search among all available values k, such as $0 \leq k \leq 15$, can be conducted but generally a limited search among $p-4 \leq k \leq p$, where p is the bit position of the most significant bit in the largest prediction error of the investigated group, is adequate. The value k leading to the most efficient coding, i.e. shortest compressed block representation is then selected and used. The encoder 149 divides the prediction errors by the number $2^k$ to get a quotient and a k-bit remainder. The remainder is then unary encoded according well known procedures. The encoded prediction error representation of a pixel then comprises the unary coded quotient, the remainder and the value k.

The units 141 to 149 of the representation determiner 140 may be provided as software, hardware or a combination thereof. The units 141 to 149 may be implemented together in the representation determiner 140. Alternatively, a distributed implementation is also possible with some of the units provided elsewhere in the compressor.

Figure 22:
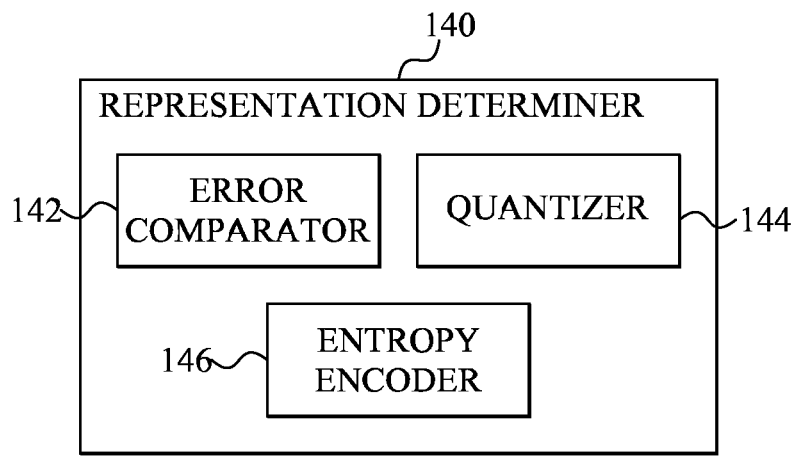
FIG. 22 is a schematic block diagram of another embodiment of the representation determiner in FIG. 17.

FIG. 22 is a schematic block diagram of an alternative embodiment of the representation determiner 140 of the block compressor. The determiner 140 comprises an error comparator 142 arranged for comparing the prediction error to a defined error threshold $T'_r$. If the error is smaller than the threshold, it does not need to be quantized further so a connected quantizer 144 simply calculated a quantized prediction error to be equal to the original prediction error. However, if the prediction error exceeds the threshold, the quantizer 144 quantizes the error using a non-linear function $f(r)=T'_r+\sqrt{r-T'_r}$.

The resulting output (quantized) prediction error from the quantizer 144 is then input to an entropy encoder 146. The operation of this encoder 146 is similar to what has previously been described in connection with FIG. 21.

The units 142 to 146 of the representation determiner 140 may be provided as software, hardware or a combination thereof. The units 142 to 146 may be implemented together in the representation determiner 140. Alternatively, a distributed implementation is also possible with some of the units provided elsewhere in the compressor.

Decompressor

Figure 23:
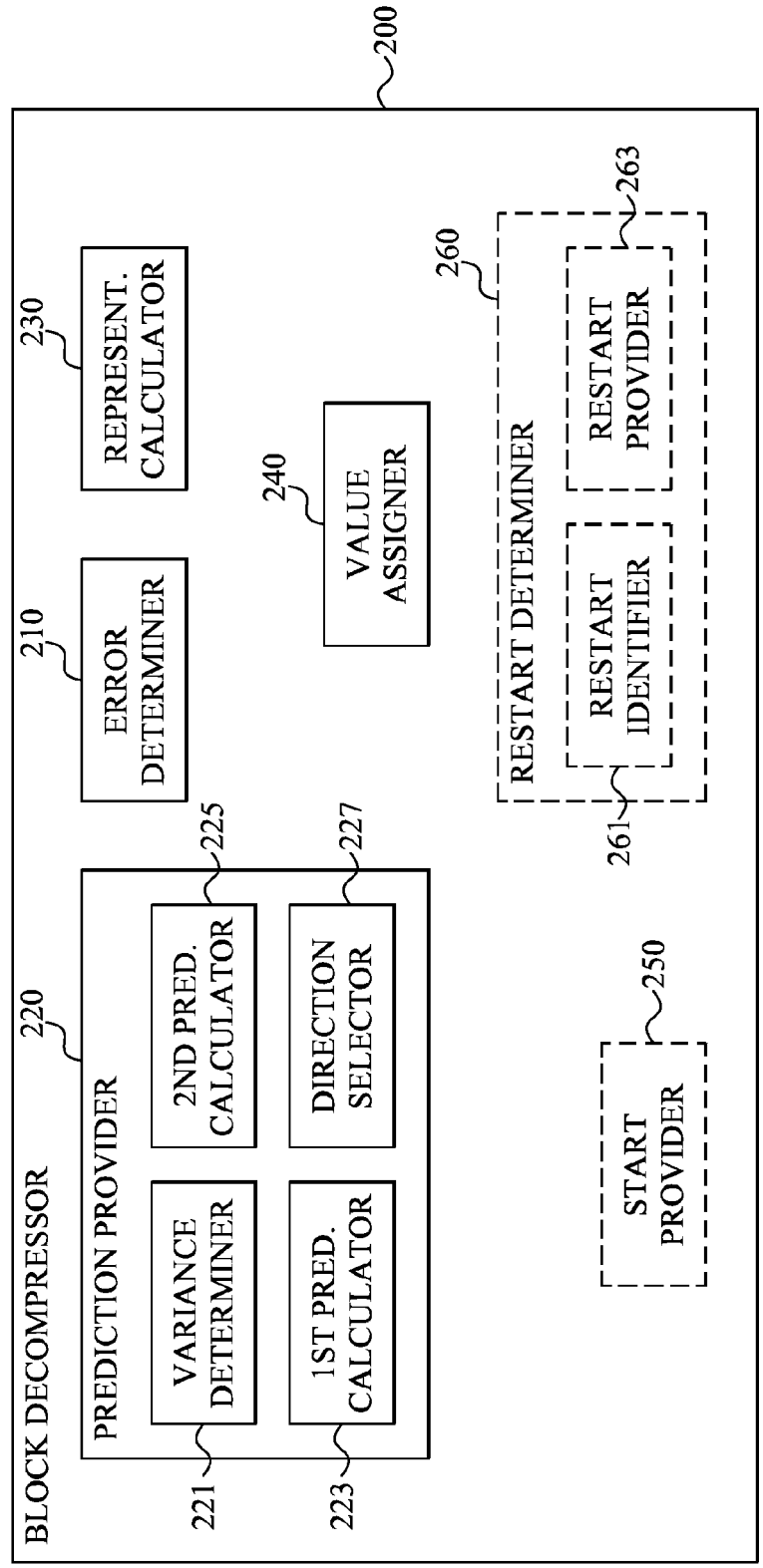
FIG. 23 is a schematic block diagram of a block decompressor according to an embodiment.

FIG. 23 is a block diagram of an embodiment of a decompressor 200 for decompressing a compressed pixel block. The decompressor 200 comprises an error determiner 210 arranged for determining a prediction error of a pixel/subblock to be decoded. This prediction error is determined based on an encoded error representation assigned to the pixel/subblock and include din the compressed pixel block.

The error determiner 210 preferably comprises a Golomb-Rice decoder (not illustrated) or another entropy decoder operating on the encoded prediction error representation in the compressed block. In particular, the decoder uses a unary coded quotient, a k-bit remainder and a value k of a pixel to calculate the prediction error as previously described.

A prediction provider 220 is implemented in the decompressor 200 for providing a prediction of the property value of the subblock. The provider 220 comprises a variance determiner 221 arranged for calculating a variance representation of neighboring property values of at least one neighboring pixel/subblock in two prediction directions in the block relative the current subblock.

In the case the variance measure is below a variance threshold, a first prediction calculator 223 becomes operable for calculating the value prediction based on neighboring property values in both prediction directions. The operation of the calculator 223 is similar to the first prediction calculator of the block compressor in FIG. 17.

However, if the variance measure is not smaller than the threshold, a direction selector 227 becomes active and selects a prediction direction based on a guiding bit associated with the current subblock. The hierarchical level of the subblock as determined through the tree code included in the compressed block and the number of guiding bits associated with the subblock defines which neighboring pixels/subblocks in the selected prediction direction to use by a second prediction calculator 225 for calculating the property value prediction. Thus, the second prediction calculator 225 could calculate the prediction to be based on i) the average of all neighboring pixels/subblocks in the relevant direction, ii) the average of a subset of the neighboring pixels/subblocks in the relevant direction, or iii) the property value of one neighboring pixel/subblock.

A representation calculator 230 uses the prediction error from the error determiner 210 and the prediction from the provider 220 to calculate the property value of the subblock. This property value is then assigned by a value assigner 240 to the individual pixels present in the pixel block at the area occupied by the subblock that has now been decompressed.

The decompressor 200 preferably also comprises a start provider 250. This start provider 250 is implemented for providing a property value of a start pixel/subblock in the block. This property value is preferably set equal to the start property value comprised in the compressed pixel block.

The prediction provider 220 preferably provides the predictions for pixels/subblocks in the same row and column as the start pixel/subblock by setting the prediction to be equal to the property value of the next previous pixel/subblock in the row or column.

A corresponding restart determiner 260 is arranged in the decompressor 200 for determining whether any restart pixel/subblock is present in the block. The determiner 260 comprises a restart identifier that investigates whether a restart bit included in the compressed block is set. If a restart value should be used, the identifier 261 uses a restart position identifier of the compressed block to identify the particular pixel position in the block that is regarded as restart pixel/subblocks. The block can comprise zero, one or multiple such restart pixels/subblocks.

A restart provider 263 sets the property value of the restart pixel/subblock based on a representation of the restart value and included in the compressed block. In a preferred implementation, the provider 263 unqantized the value from the block by extending it into a target number of bits and then assigns it to the identified pixel/subblock.

The units 210 to 260 of the decompressor 200 may be provided as software, hardware or a combination thereof. The units 210 to 260 may be implemented together in the decompressor 200. Alternatively, a distributed implementation is also possible with some of the units provided elsewhere in the buffer architecture.

Figure 24:
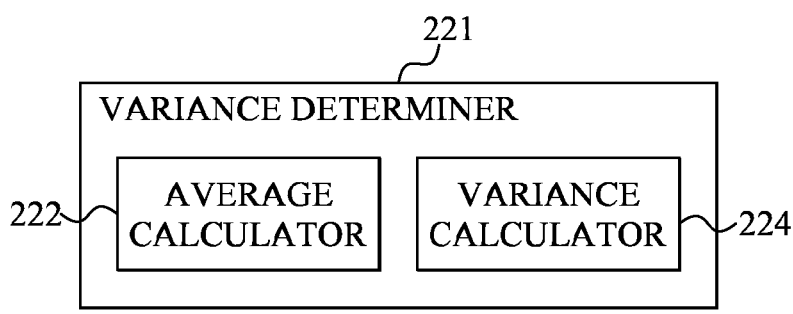
FIG. 24 is a schematic block diagram of an embodiment of the variance determiner in FIG. 23.

FIG. 24 is a schematic block diagram of an embodiment of the variance determiner 221 of the decompressor in FIG. 23. The determiner 221 comprises an average calculator 222 for determining an average value of the input neighboring pixels or subblocks. The variance measure is then calculated by a variance calculator 224 based on respective absolute differences between the average and the respective neighboring property values.

The units 222 and 224 of the variance determiner 221 may be provided as software, hardware or a combination thereof. The units 222 and 224 may be implemented together in the variance determiner 221. Alternatively, a distributed implementation is also possible with some of the units provided elsewhere in the decompressor.

It will be understood by a person skilled in the art that various modifications and changes may be made to the present invention without departure from the scope thereof, which is defined by the appended claims.

The invention claimed is:

1. A method of compressing a block of multiple pixels each having a respective property value, said method comprising the steps of:
   hierarchically defining a subblock in said block based on property values of a subset of said multiple pixels or of a set of hierarchically lower subblocks in said block;
   determining a property value for said subblock based on at least a portion of said property values of said subset of said multiple pixels or of said set of hierarchically lower subblocks;
   providing a prediction of said determined property value by:
      a) determining a first variance representation of property value(s) of at least one neighboring pixel or subblock in a first prediction direction in said block and property value(s) of at least one neighboring pixel or subblock in a second prediction direction in said block;
      b) determining said prediction based on a weighted combination of at least one property value of said at least one neighboring pixel or subblock in said first prediction direction and at least one property value of said at least one neighboring pixel or subblock in said second prediction direction if said first variance representation is smaller than a first variance threshold;
      c) selecting a prediction direction of said first and second prediction directions if said first variance representation is not smaller than said first variance threshold;
      d) determining said prediction to be based on at least one property value of said at least one neighboring pixels or subblocks in said selected prediction direction if said first variance representation is not smaller than said first variance threshold;
      e) providing a first guiding bit associated with said selected prediction direction if said first variance representation is not smaller than said first variance threshold;
   calculating a prediction error based on said determined property value and said provided prediction; and
   determining an encoded representation of said prediction error, wherein a compressed representation of said block comprises said encoded representation and said optional first guiding bit.

2. The method according to claim 1, wherein said hierarchically defining step comprises:
   calculating an average value of said property values of said subset of said multiple pixels or of said set of hierarchically lower subblocks; and
   organizing said subset of said multiple pixels or said set of hierarchically lower subblocks into said subblock if respective absolute differences between said average value and said property values of said subset of said multiple pixels or of said set of hierarchically lower subblocks are below a difference threshold.

3. The method according to claim 2, further comprising determining said difference threshold based on whether said organizing step comprises organizing said subset of said multiple pixels into said subblock or organizing said set of hierarchically lower subblocks into said subblock.

4. The method according to claim 2, further comprising the steps of:

estimating an error value indicative of an error in representing said property values of said subset of multiple pixels or of said set of hierarchically lower subblocks with said determined property value;

updating, based on said error value, an accumulated error associated with said block and indicative of approximation errors in representing said block with said compressed representation of said block; and determining said difference threshold based on said updated accumulated error.

5. The method according to claim 1, wherein said selecting step c) comprises the steps of:

calculating a first difference between said determined property value and a representation of said property value(s) of said at least one neighboring pixel block or subblock in said first prediction direction;

calculating a second difference between said determined property value and a representation of said property value(s) of said at least one neighboring pixel block or subblock in said second prediction direction; and selecting said prediction direction based on a comparison of said first difference and said second difference.

6. The method according to claim 1, wherein said determining step d) comprises the steps of:

determining a second variance representation of said property values of said neighboring pixels or subblocks in said selected prediction direction;

determining said prediction based on an average of said property values of said neighboring pixels or subblocks in said selected prediction direction if said second variance representation is smaller than a second variance threshold;

determining said prediction based on a subset of said property values of said neighboring pixels or subblocks in said selected prediction direction if said second variance representation is not smaller than said second variance threshold; and providing a second guiding bit associated with said subset of said property values if said second variance representation is not smaller than said second variance threshold, wherein said compressed representation of said block comprises said optional second guiding bit.

7. The method according to claim 1, wherein said step of determining said encoded representation of said prediction error comprises the steps of:

determining an error weight based on an accumulated error associated with said block and representative of approximation errors in representing said block with said compressed representation of said block;

determining a hierarchical weight based on whether said hierarchically defining step comprises defining said subset of said multiple pixels into said subblock or defining said set of hierarchically lower subblocks into said subblock;

calculating a quantization parameter based on said error weight, said hierarchical weight and a default quantization parameter;

calculating a quantized prediction error based on said prediction error and said quantization parameter; and entropy encoding said quantized prediction error to form said encoded representation of said prediction error.

8. A method of decompressing a compressed pixel block, said method comprising the steps of:

determining, for a pixel subblock of said block, a prediction error based on an encoded error representation associated with said subblock and comprised in said compressed pixel block;

providing a prediction of a property value of said subblock by:

a) determining a first variance representation of property value(s) of at least one neighboring pixel or subblock in a first prediction direction in said block and property value(s) of at least one neighboring pixel or subblock in a second prediction direction in said block;

b) calculating said prediction based on a weighted combination of at least one property value of said at least one neighboring pixel or subblock in said first prediction direction and at least one property value of said at least one neighboring pixel or subblock in said second prediction direction if said first variance representation is smaller than a first variance threshold;

c) selecting a prediction direction of said first prediction direction and said second prediction direction based on a first guiding bit associated with said subblock and comprised in said compressed pixel block if said first variance representation is not smaller than said first variance threshold;

d) calculating said prediction to be based on at least one property value of said at least one neighboring pixels or subblocks in said selected prediction direction if said first variance representation is not smaller than said first variance threshold;

calculating a representation of said property value of said subblock based on said prediction error and said prediction; and assigning said representation of said property values to multiple pixels in said block organized into said subblock.

9. The method according to claim 8, wherein said calculating step d) comprises the steps of:

determining a second variance representation of said property values of said neighboring pixels or subblocks in said selected prediction direction;

calculating said prediction based on an average of said property values of said neighboring pixels or subblocks in said selected prediction direction if said second variance representation is smaller than a second variance threshold;

identifying a subset of said property values of said neighboring pixels or subblocks in said selected prediction direction based on a second guiding bit associated with said subblock and comprised in said compressed pixel block if said second variance representation is not smaller than a second variance threshold; and calculating said prediction based on said identified subset of said property values if said second variance representation is not smaller than said second variance threshold.

10. The method according to claim 8, wherein said determining step a) comprises the steps of:

calculating an average value of said property values of said neighboring pixels or subblocks; and calculating said variance representation based on respective squared differences between said average value and said property values of said neighboring pixels or subblocks.

11. A block compressor for compressing a block of multiple pixels each having a respective property value, said block compressor comprises:

a subblock definer for hierarchically defining a subblock in said block based on property values of a subset of said multiple pixels or of a set of hierarchically lower subblocks in said block;

a value determiner for determining a property value for said subblock based on at least a portion of said property values of said subset of said multiple pixels or of said set of hierarchically lower subblocks;

a prediction provider for providing a prediction of said determined property value, said prediction provider comprising:

a variance determiner fur determining a first variance representation of property value(s) of at least one neighboring pixel or subblock in a first prediction direction in said block and property value(s) of at least one neighboring pixel or subblock in a second prediction direction in said block;

a first prediction determiner adapted to operate if said first variance representation is smaller than a first variance threshold and arranged for determining said prediction based on a weighted combination of at least one property value of said at least one neighboring pixel or subblock in said first prediction direction and at least one property value of said at least one neighboring pixel or subblock in said second prediction direction;

a direction selector adapted to operate if said first variance representation is not smaller than said first variance threshold and arranged for selecting a prediction direction of said first and second prediction directions;

a second prediction determiner adapted to operate if said first variance representation is not smaller than said first variance threshold and arranged for determining said prediction to be based on at least one property value of said at least one neighboring pixels or subblocks in said selected prediction direction;

a guiding bit provider adapted to operate if said first variance representation is not smaller than said first variance threshold and arranged for providing a first guiding bit associated with said selected prediction direction;

an error calculator for calculating a prediction error based on said determined property value and said provided prediction; and a representation determiner for determining an encoded representation of said prediction error, wherein a compressed representation of said block comprises said encoded representation and said optional first guiding bit.

12. The compressor according to claim 11, wherein said subblock definer comprises:

an average calculator for calculating an average value of said property values of said subset of said multiple pixels or of said set of hierarchically lower subblocks; and an organizer for organizing said subset of said multiple pixels or said set of hierarchically lower subblocks into said subblock if respective absolute differences between said average value and said property values of said subset of said multiple pixels or of said set of hierarchically lower subblocks are below a difference threshold.

13. The compressor according to claim 12, further comprising:

an error estimator for estimating an error value indicative of an error in representing said property values of said subset of multiple pixels or of said set of hierarchically lower subblocks with said determined property value;

an error updater for updating, based on said error value, an accumulated error associated with said block and indicative of approximation errors in representing said block with said compressed representation of said block; and a threshold determiner for determining said difference threshold based on said updated accumulated error.

14. The compressor according to claim 11, wherein said direction selector comprises a difference calculator for i) calculating a first difference between said determined property value and a representation of said property value(s) of said at least one neighboring pixel block or subblock in said first prediction direction, and ii) calculating a second difference between said determined property value and a representation of said property value(s) of said at least one neighboring pixel block or subblock in said second prediction direction, and wherein said direction selector is arranged for selecting said prediction direction based on a comparison of said first difference and said second difference.

15. The compressor according to claim 11, wherein:

said variance determiner is arranged for determining a second variance representation of said property values of said neighboring pixels or subblocks in said selected prediction direction;

said first prediction determiner is adapted to operate if said second variance representation is smaller than a second variance threshold and is arranged for determining said prediction based on an average of said property values of said neighboring pixels or subblocks in said selected prediction direction;

said second prediction determiner is adapted to operate if said second variance representation is not smaller than said second variance threshold and is arranged for determining said prediction based on a subset of said property values of said neighboring pixels or subblocks in said selected prediction direction; and said guiding bit provider is adapted to operate if said second variance representation is not smaller than said second variance threshold and is arranged for providing a second guiding bit associated with said subset of said property values, wherein said compressed representation of said block comprises said optional second guiding bit.

16. A block decompressor for decompressing a compressed pixel block, said block decompressor comprises:

an error determiner for determining, for a pixel subblock of said block, a prediction error based on an encoded error representation associated with said subblock and comprised in said compressed pixel block;

a prediction provider for providing a prediction of a property value of said subblock and comprising:

a variance determiner for determining a first variance representation of property value(s) of at least one neighboring pixel or subblock in a first prediction direction in said block and property value(s) of at least one neighboring pixel or subblock in a second prediction direction in said block;

a first prediction calculator adapted to operate if said first variance representation is smaller than a first variance threshold and arranged for calculating said prediction based on a weighted combination of at least one property value of said at least one neighboring pixel or subblock in said first prediction direction and at least one property value of said at least one neighboring pixel or subblock in said second prediction direction;

a direction selector adapted to operate if said first variance representation is not smaller than said first variance threshold and arranged for selecting a prediction direction of said first prediction direction and said second prediction direction based on a first guiding bit associated with said subblock and comprised in said compressed pixel block;

a second prediction calculator adapted to operate if said first variance representation is not smaller than said first variance threshold and arranged for calculating said prediction to be based on at least one property value of said at least one neighboring pixels or subblocks in said selected prediction direction;

a representation calculator for calculating a representation of said property value of said subblock based on said prediction error and said prediction; and a value assigner for assigning said representation of said property values to multiple pixels in said block organized into said subblock.

17. The decompressor according to claim 16, wherein said variance determiner comprises:

an average calculator for calculating an average value of said property values of said neighboring pixels or subblocks; and a variance calculator for calculating said variance representation based on respective squared differences between said average value and said property values of said neighboring pixels or subblocks.

18. The decompressor according to claim 16, wherein:

said variance determiner is arranged for determining a second variance representation of said property values of said neighboring pixels or subblocks in said selected prediction direction;

said first prediction calculator is adapted to operate if said second variance representation is smaller than a second variance threshold and is arranged for calculating said prediction based on an average of said property values of said neighboring pixels or subblocks in said selected prediction direction;

said direction selector is adapted to operate if said second variance representation is not smaller than a second variance threshold and is arranged for identifying a subset of said property values of said neighboring pixels or subblocks in said selected prediction direction based on a second guiding bit associated with said subblock and comprised in said compressed pixel block; and said second prediction calculator is adapted to operate if said second variance representation is not smaller than said second variance threshold and is arranged for calculating said prediction based on said identified subset of said property values.

* * * * *